US012796582B2

(12) United States Patent
Burjes et al.

(10) Patent No.: US 12,796,582 B2
(45) Date of Patent: Nov. 17, 2026

(54) DRAFT CONTROL USING INFORMATION FROM ELECTRIC DRIVE SYSTEM OF SPLIT-PATH TRANSMISSION

(71) Applicant: Deere & Company, Moline, IL (US)

(72) Inventors: Roger W. Burjes, Cedar Falls, IA (US); Rainer Gugel, Plankstadt (DE); Edwin R. Kreis, Waterloo, IA (US); Curtis R. Jensen, Greeley, IA (US)

(73) Assignee: Deere & Company, Moline, IL (US)

( * ) Notice: Subject to any disclaimer, the term of this patent is extended or adjusted under 35 U.S.C. 154(b) by 400 days.

(21) Appl. No.: 18/415,857

(22) Filed: Jan. 18, 2024

(65) Prior Publication Data

US 2024/0260496 A1 Aug. 8, 2024

Related U.S. Application Data

(60) Provisional application No. 63/483,139, filed on Feb. 3, 2023.

(51) Int. Cl.
*A01B 63/112* (2006.01)

(52) U.S. Cl.
CPC .................................. *A01B 63/112* (2013.01)

(58) Field of Classification Search
CPC .............................................. A01B 63/00-112
See application file for complete search history.

(56) References Cited

U.S. PATENT DOCUMENTS

| | | | |
|---|---|---|---|
| 2,864,295 | A | 12/1958 | Wallace et al. |
| 2,940,350 | A | 6/1960 | Varn |
| 2,974,733 | A | 3/1961 | Fletcher |
| 3,022,831 | A | 2/1962 | Hess |

(Continued)

FOREIGN PATENT DOCUMENTS

| | | | |
|---|---|---|---|
| DE | 19649273 | A1 | 6/1998 |
| DE | 102011076296 | A1 | 11/2012 |

(Continued)

OTHER PUBLICATIONS

German Search Report issued in application No. 102024103006.2 dated Sep. 27, 2024, 08 pages.

(Continued)

*Primary Examiner* — Jelani A Smith
*Assistant Examiner* — Alyssa Rorie
(74) *Attorney, Agent, or Firm* — Tucker Ellis LLP

(57) ABSTRACT

A draft force imposed upon a tractor by a ground engaging member of an implement attached with the tractor is controlled. A signal in a drivetrain of the tractor is detected, wherein the signal may be an electrical signal such as a voltage or current signal representative of a sensed draft force imposed upon the tractor by the ground engaging member of the implement attached with the tractor. The detected drivetrain signal may also be a data signal representative of the sensed draft force. The sensed signal representative of the sensed draft force is compared with a desired draft force. An output signal is generated based on a difference between the sensed current representative of the sensed draft force and the desired draft force. The generated output signal may be used to effect a vertical movement of the ground engaging member of the implement relative to the ground.

20 Claims, 7 Drawing Sheets

(56) References Cited

U.S. PATENT DOCUMENTS

| | | | | |
|---|---|---|---|---|
| 3,516,498 | A | 6/1970 | Schowalter | |
| 3,575,241 | A | 4/1971 | McKeon et al. | |
| 4,023,622 | A | 5/1977 | Gregerson | |
| 4,160,485 | A | 7/1979 | McLean | |
| 4,503,916 | A | 3/1985 | Wiegardt | |
| 4,518,044 | A | 5/1985 | Wiegardt et al. | |
| 4,677,542 | A | 6/1987 | Kasten | |
| 4,747,301 | A * | 5/1988 | Bellanger | G07C 5/08 73/114.53 |
| 4,796,712 | A | 1/1989 | Rutkowski et al. | |
| 4,807,136 | A | 2/1989 | Rutkowski et al. | |
| 4,846,283 | A | 7/1989 | Batcheller et al. | |
| 4,907,653 | A | 3/1990 | Bellanger et al. | |
| 5,040,119 | A | 8/1991 | Hardy et al. | |
| 5,101,909 | A | 4/1992 | Vangerpen | |
| 5,454,432 | A | 10/1995 | Le Clezio | |
| 5,549,166 | A | 8/1996 | Orbach et al. | |
| 5,684,691 | A | 11/1997 | Orbach et al. | |
| 5,755,291 | A | 5/1998 | Orbach et al. | |
| 5,856,709 | A * | 1/1999 | Ibaraki | B60W 10/08 475/5 |
| 5,894,894 | A | 4/1999 | Szymczak | |
| 5,911,769 | A * | 6/1999 | Orbach | A01B 63/112 172/7 |
| 6,076,612 | A | 6/2000 | Carr et al. | |
| 6,105,679 | A | 8/2000 | Schubert et al. | |
| 6,216,072 | B1 | 4/2001 | Boe et al. | |
| 6,547,012 | B2 | 4/2003 | Scarlett et al. | |
| 6,942,595 | B2 | 9/2005 | Hrazdera | |
| 7,458,428 | B2 | 12/2008 | Laudick et al. | |
| 7,600,574 | B2 | 10/2009 | Chauvel | |
| 7,721,813 | B2 | 5/2010 | Hou | |
| 7,725,234 | B2 | 5/2010 | Shull | |
| 7,832,520 | B2 | 11/2010 | Murakami et al. | |
| 7,954,556 | B2 | 6/2011 | Hou et al. | |
| 8,141,650 | B2 | 3/2012 | Breiner et al. | |
| 8,352,121 | B2 | 1/2013 | Bitter | |
| 8,573,319 | B1 | 11/2013 | Casper et al. | |
| 8,762,001 | B2 | 6/2014 | Matsuzaki et al. | |
| 8,858,395 | B2 | 10/2014 | Li | |
| 9,033,062 | B2 | 5/2015 | Stratton et al. | |
| 9,334,827 | B2 | 5/2016 | Seelke et al. | |
| 9,686,902 | B2 | 6/2017 | Thomson | |
| 9,706,696 | B2 | 7/2017 | Gschwendtner | |
| 9,845,008 | B2 | 12/2017 | Brownell et al. | |
| 9,883,622 | B2 | 2/2018 | Gschwendtner et al. | |
| 9,989,986 | B2 | 6/2018 | Foster et al. | |
| 10,086,686 | B2 | 10/2018 | Mueller et al. | |
| 10,099,736 | B2 | 10/2018 | Gugel et al. | |
| 10,172,273 | B2 | 1/2019 | Gschwendtner et al. | |
| 10,267,018 | B2 | 4/2019 | Benson et al. | |
| 10,512,203 | B2 | 12/2019 | Gschwendtner et al. | |
| 10,519,627 | B2 | 12/2019 | Ge | |
| 11,052,747 | B2 | 7/2021 | Ore | |
| 11,052,769 | B2 | 7/2021 | Vande Haar et al. | |
| 11,396,231 | B2 | 7/2022 | Burjes et al. | |
| 11,498,567 | B2 | 11/2022 | Billich | |
| 2006/0016609 | A1 | 1/2006 | Chauvel | |
| 2008/0053669 | A1 * | 3/2008 | Hou | A01B 63/112 172/3 |
| 2008/0257569 | A1 * | 10/2008 | Foster | A01B 63/145 172/7 |
| 2008/0257570 | A1 | 10/2008 | Keplinger et al. | |
| 2008/0267719 | A1 | 10/2008 | Corcoran | |
| 2012/0239260 | A1 * | 9/2012 | Ishikawa | A01B 63/1145 701/50 |
| 2014/0343802 | A1 * | 11/2014 | Pichlmaier | A01B 63/112 701/50 |
| 2017/0129558 | A1 | 5/2017 | Gugel et al. | |
| 2017/0215327 | A1 * | 8/2017 | Gschwendtner | A01B 63/112 |
| 2020/0114919 | A1 | 4/2020 | Billich | |
| 2023/0090923 | A1 * | 3/2023 | Tione | B60T 1/10 701/69 |
| 2023/0170831 | A1 * | 6/2023 | Hoshino | F04B 35/04 318/445 |

FOREIGN PATENT DOCUMENTS

| | | | |
|---|---|---|---|
| DE | 102021115611 | A1 | 1/2022 |
| EP | 2979528 | A1 | 2/2016 |
| EP | 2984914 | B1 | 10/2018 |
| EP | 3202244 | B1 | 10/2020 |
| WO | 2013053645 | A1 | 4/2013 |

OTHER PUBLICATIONS

Dr.-Ing. H. Hesse, Engineering Office for Hydraulics, Stuttgart, Tractor Hitch-Control—History and Future, publicly available before Jan. 2023, 9 pages.

The New Ford 7000—Ad Brochure, publicly available before Jan. 2023, 12 pages.

Ford Load Monitor article, publicly available before Jan. 2023, 1 page.

* cited by examiner

DRAFT CONTROL USING INFORMATION FROM ELECTRIC DRIVE SYSTEM OF SPLIT-PATH TRANSMISSION

CROSS-REFERENCE TO RELATED APPLICATIONS

This application claims the benefit of and priority to U.S. Provisional Application No. 63/483,139, filed Feb. 3, 2023, the disclosure of which is hereby incorporated by reference herein in its entirety.

BACKGROUND

Agricultural and other implements can be attached to a three point hitch of a tractor. Many three point hitches include a draft sensing mechanism that provides a draft force signal to a control system that lowers and raises the implement carried on the hitch as a function of sensed draft force and possibly as a function of other sensed parameters, such as position, engine speed, wheel slip, etc. By controlling draft forces, the tractor is more likely to be able to move through tough spots without operator intervention thusly avoiding the tractor from stalling out. Another reason for controlling draft forces is that the draft sensing system can better maintain implement depth while traversing through terrain changes thereby reducing the likelihood of the implement excessively digging into the soil or coming out of the soil. One type of draft sensing mechanism providing a draft force signal to a control system for lowering and raising an implement carried on a hitch as a function of sensed draft force and possibly as a function of other sensed parameters, such as position, engine speed, wheel slip, etc., is a “bending bar” mechanism. However, the bending bar is only one of several mechanisms and methods that are used to obtain the draft force.

Some known production draft sensing mechanisms have a number of moving parts that require periodic maintenance. This includes removing mud and dirt accumulation and lubricating draft sensor plunger and other mechanisms to prevent moisture and dirt contamination. In certain conditions, accumulated dirt and mud can prevent the required component movement and can cause false draft force signals. Future tractor designs will have less room for such draft sensor components. Thus, it is desired to have a draft sensor which requires less space, which has no moving parts requiring lubrication and which does not need to be protected from dirt accumulation.

Draft sensing mechanisms for implements that are attached to the tractor by a three point hitch have required costly instrumented sensing pins, bending bars, draft sensing shafts, strain gage sensors, and the like. Draft sensing pins require two instrument pins which double the cost and can decrease the reliability. Certain current draft sensing systems for example on four wheel drive tractors measure the deflections of draft link mount straps. These straps are large and require a large number of parts to measure the signal. In addition, these system also have numerous moving parts that may become damaged or otherwise compromised during use.

Other known a draft sensing mechanisms for implements that are attached to the tractor by a drawbar or ball mount have required costly draft sensing pins, bending bars, draft sensing shafts, strain gage sensors, and the like. Draft sensing pins require two instrument pins which double the cost and can decrease the reliability. Certain current draft sensing systems for example on four wheel drive tractors measure the deflections of draft link mount straps. These straps are large and require a large number of parts to measure the signal. In addition, these system also have numerous moving parts that may become damaged or otherwise compromised during use.

Overall, both the bending bar type systems as well as the draft sensing shaft systems have moving parts that require sealed compartments and a fair amount of space at the hitch or drawbar.

SUMMARY

A simpler, lower cost, more reliable, and more accurate draft sensing mechanism is provided.

Various aspects of examples of the present disclosure are set out in the claims, and example implementations are described herein.

In accordance with an aspect of this disclosure, a control system is provided that generates a signal used to modify the working depth of an implement attached with a tractor based on a draft force that is sensed without working parts at the implement.

In accordance with a further aspect of this disclosure, a control system is provided that generates a signal used to modify the working depth of an implement attached with a tractor based on a draft force that is sensed without working parts at devices coupling the implement with the tractor such as hitches and/or drawbars.

In accordance with a further aspect of this disclosure, a control system is provided that generates a signal controlling an electro-hydraulic system of a tractor based on a sensed draft force to modify the working depth of an implement by raising and/or lowering the implement using the electro-hydraulic system of the tractor, wherein the draft force is sensed internally within an electric infinitely/continuously variable transmission (eCVT) of the tractor.

In accordance with a further aspect of this disclosure, a control system is provided that generates a signal controlling a hitch of a tractor based on a sensed draft force to modify the working depth of an implement by raising and/or lowering a hitch attaching the implement with the tractor, wherein the draft force is sensed internally within an electric infinitely/continuously variable transmission (eCVT) of the tractor. In an example implementation, the hitch may be raised and/or lowered by an electro-hydraulic system of the tractor in response to the signal from the control system.

In accordance with a further aspect of this disclosure, a control system is provided that generates a signal controlling one or more selective control valves (SCVs) of a tractor based on a sensed draft force to modify the working depth of a drawbar-attached implement, wherein the draft force is sensed internally within an eCVT of the tractor. In an example implementation, the working depth of a drawbar-attached implement may be increased and/or decreased by an electro-hydraulic system of the tractor activating the one or more SCVs in response to the signal from the control system. For control of drawbar mounted implements, a control system is provided that generates a signal controlling selective control valves to control the functions on the implement.

In accordance with a further aspect of this disclosure, a control system is provided that generates a signal controlling one or more electrical power systems off-board of the tractor based on a sensed draft force to modify the working depth of a drawbar-attached implement, wherein the draft force is sensed internally within an eCVT of the tractor. In an example implementation, the working depth of a drawbar-attached implement may be increased and/or decreased by an electro-hydraulic system of the tractor activating the one or more off-board power systems in response to the signal from the control system. For three point hitch mounted implements, a control system is provided that generates a signal controlling a hydraulic system that uses a electrohydraulic hitch valve for raising and lowering the hitch.

In accordance with a further aspect of this disclosure, an inverter senses a current in one or more continuously variable machines (CVMs), wherein the sensed current is representative of a draft force of a working implement on a tractor.

In accordance with a further aspect of this disclosure, an electronic control unit (ECU) determines transmission output torque from a sensed current in one or more CVMs. In an example implementation, the determined transmission output torque is representative of a draft force of a working implement on a tractor.

In accordance with a further aspect of this disclosure, an ECU determines transmission output torque from a sensed current in one or more CVMs, wherein the determined transmission output torque is based or otherwise dependent upon one or more of a mode of the transmission, a gear of the transmission, a speed of the transmission, and/or a final gear ratio of the transmission.

In accordance with a further aspect of this disclosure, an ECU determines drawbar or draft load from determined transmission output torque.

In accordance with a further aspect of this disclosure, an ECU determines whether the determined draft load is between a lower threshold and an upper threshold.

In accordance with a further aspect of this disclosure, an ECU adjusts the implement in a first direction when the calculated draft load is below the lower threshold (e.g., lowers the implement via the three-point hitch or SCV or otherwise adjusts implement to increase draft load).

In accordance with a further aspect of this disclosure, an ECU adjusts the implement in a second direction when the calculated draft load is above the upper threshold (e.g., raises the implement via the three-point hitch or SCV or otherwise adjusts implement to decrease draft load).

In accordance with a further aspect of this disclosure, an operator interface receives input signals from an operator wherein the received signals are used by the ECU to set or otherwise adjust one or more of the lower and/or upper thresholds via the operator interface.

In accordance with a further aspect of this disclosure, an operator interface receives input signals from an operator wherein the received signals are used by the ECU to activate and/or deactivate automated draft sensing by the system via the operator interface.

In accordance with a further aspect of this disclosure, an operator interface includes a display that provides a visual indication of a condition or state of the system including an indication of the system in an activated condition or state and/or an indication of the system in a deactivated condition or state.

In accordance with a further aspect of this disclosure, an operator interface includes a display that provides a visual indication of a draft load. In accordance with an aspect of this disclosure, the operator interface display provides a visual indication of the draft load being above and/or below the upper and/or lower threshold(s).

In accordance with a further aspect of this disclosure, an operator interface includes a display that provides a visual indication of whether system is actively adjusting the implement. In accordance with an aspect of this disclosure, the operator interface display provides a visual indication of the system actively adjusting the working depth of an implement attached with the tractor. In accordance with an aspect of this disclosure, the operator interface display provides a visual indication of the system actively adjusting the working depth of an implement attached with the tractor based on a sensed draft force. In accordance with an aspect of this disclosure, the operator interface display provides a visual indication of the system actively adjusting the working depth of an implement attached with the tractor based on a draft force that is sensed without working parts at the implement and/or without working parts at a drawbar pulling the implement and/or without working parts at a hitch carrying the implement on the tractor.

The above and other features will become apparent from the following description and accompanying drawings.

BRIEF DESCRIPTION OF THE DRAWINGS

The detailed description of the drawings refers to the accompanying figures.

Like reference numerals are used to indicate like elements throughout the several figures.

DETAILED DESCRIPTION

Figure 1:
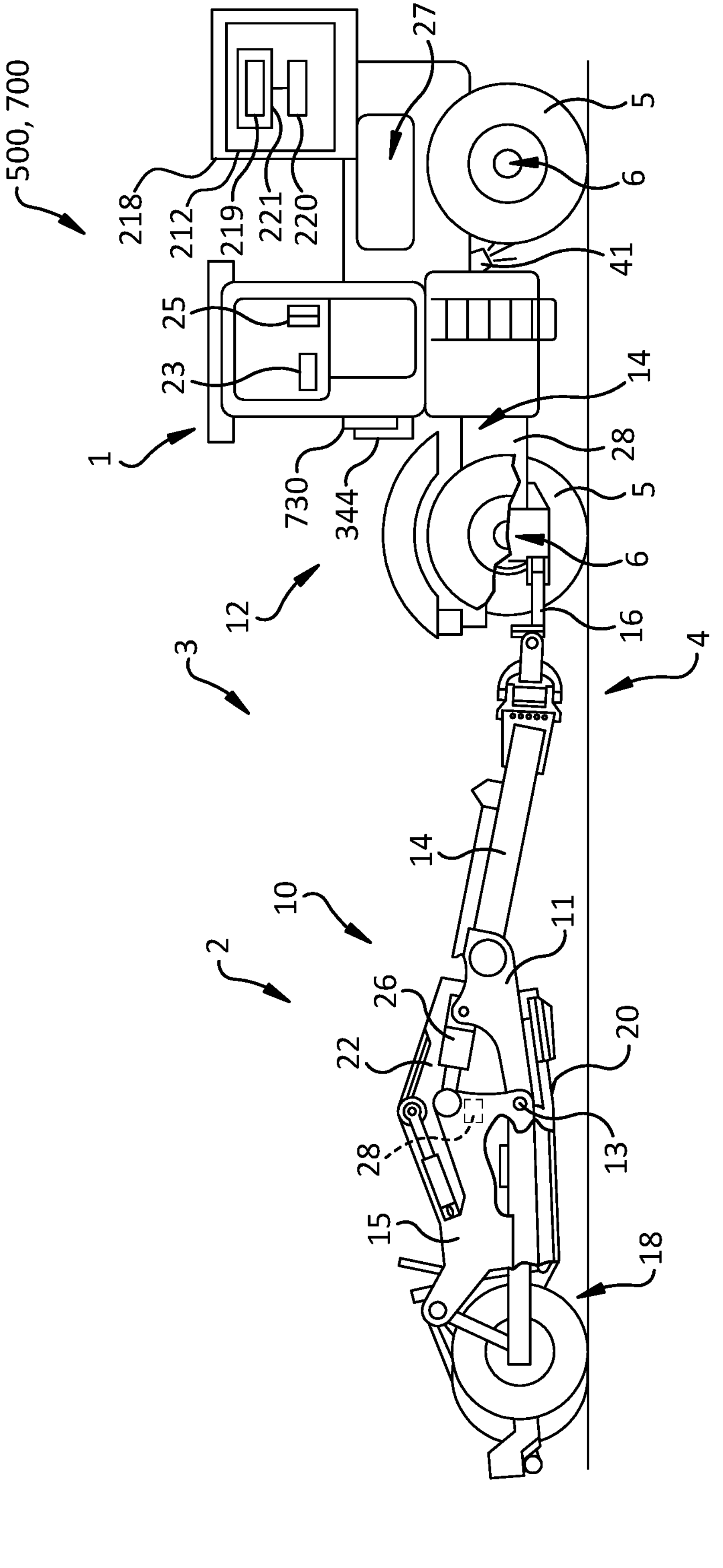
FIG. 1 is a simplified side view of an implement pulled by a tractor.

At least one example embodiment of the subject matter of this disclosure is understood by referring to FIGS. 1 through 7 of the drawings. In the following description reference is made to the accompanying figures which form a part thereof, and in which is shown, by way of illustration, one or more example embodiments of the disclosed draft control systems and methods for controlling an amount of draft force imposed upon a tractor by a ground engaging implement by modifying the working depth of the implement based on a draft force that is sensed internally within an eCVT of the tractor.

The systems and methods beneficially help with use of ground engaging implements by eliminating draft sensors and other devices on the hitch or drawbar that can sometimes malfunction or accumulate dirt and mud preventing the required component movement that can cause false draft force signals or the like. For convenience of notation, "component" may be used herein, particularly in the context of a planetary gear set, to indicate an element for transmission of power, such as a sun gear, a ring gear, or a planet gear carrier. Further, references to a "continuously" variable transmission, powertrain, or power source will be understood to also encompass, in various embodiments, configurations including an "infinitely" variable transmission, powertrain, or power source.

In the discussion below, various example configurations of shafts, gears, and other power transmission elements are described. It will be understood that various alternative configurations may be possible, within the spirit of this disclosure. For example, various configurations may utilize multiple shafts in place of a single shaft (or a single shaft in place of multiple shafts), may interpose one or more idler gears between various shafts or gears for the transmission of rotational power, and so on.

In accordance with the example embodiments, it may be useful, in a variety of settings, to utilize both a traditional engine (e.g., an internal combustion engine) and at least one continuously variable power source (CVP) (e.g., an electric motor/generator or hydraulic motor/pump, and so on) with one or more continuously variable machines (CVMs) to provide useful power to an output member. For example, a portion of engine power may be diverted to drive a first CVM, which may in turn drive a second CVM. Power from the engine and/or the second CVP may be delivered to the output member (e.g., a vehicle axle or other output shaft). The engine, the CVMs, and the output member may be operatively connected via an infinitely or continuously variable transmission (CVT).

The continuously variable transmission (CVT) of the present disclosure may provide a plurality of different modes. For example, a "split-path" power transmission mode may be provided, in which power from both the engine and a CVP is combined for delivery of useful power to the output member. This is called "split-path" power transmission because it is split between a direct mechanical path from the engine and an infinitely/continuously variable path through one or more CVPs. In additional embodiments, useful power may be provided by a CVP but not by the engine (except to the extent the engine drives the CVP). This may be referred to as "CVP-only" power transmission or series mode. Finally, in some embodiments, useful power may be provided by the engine (e.g., via various mechanical transmission elements, such as shafts and gears), but not by a CVP. This may be referred to as "mechanical-path" power delivery. An example is a power takeoff (PTO) driven by a hydraulic, mechanical, and/or electric power equipment unit power source on the working vehicle and coupled to the work vehicle engine by various mechanical transmission elements other than the CVP, such as by direct connection.

In certain embodiments, an engine may provide power via various mechanical (or other) power transmission elements (e.g., various shafts and gears, and so on) to both a first input component of a variator (e.g., a planet carrier of a summing planetary gear set) and an input interface (e.g., a splined connection for a rotating shaft) of a first CVP. The first CVP (e.g., an electrical or hydraulic machine) may convert the power to a different form (e.g., electrical or hydraulic power) for transmission to a second CVP (e.g., another electrical or hydraulic machine), in order to allow the second CVP to provide rotational power to a second input of the variator (e.g., a sun gear of the summing planetary gear set).

As such, the example transmission of the present disclosure is a CVT that may be configured to operate over a plurality of modes that provide different output speed ranges. The example transmission includes a number of rotating components, such as shafts, clutches, bearings, and/or other components to implement such operation. It is important to control the torque applied to the transmission and its components including the axles and other drivetrain components to help to maintain a desired draft force between the tractor and the implement.

Accordingly, the present disclosure provides a draft control system that monitors and/or evaluates the torque generated by a power equipment unit and delivered to the components of the powertrain, particularly the transmission. In one example, the draft control system generates torque usage values for a component of interest based on the torque applied to the respective component. The torque applied to the respective component may be derived from the commanded torque of the CVP, which is generally generated by a vehicle controller during operation of the powertrain. In particular, the draft control system may use a torque gear ratio constant of the designated mode to derive the torque applied to the component from the commanded torque of the CVP.

As will become apparent from the discussion herein, the disclosed draft control system may be used advantageously in a variety of systems and with a variety of machinery. Referring now to the drawings, wherein the showings are only for the purpose of illustrating the example embodiments only and not for purposes of limiting the same, draft control systems and methods, according to example embodiments, are explained on the basis of an example of an agricultural work vehicle 1 with an implement 2 in the form of a pull-type scraper 10. It is to be appreciated that the embodiments of the invention as claimed can nevertheless be applied to any desired operating machine with movable operating tools, such as different kinds of tractor, harvesters, log skidders, graders, or various other work vehicle types and construction and factory automation equipment, and the like. To that end, FIG. 1 illustrates schematically a side view of a first embodiment of a working vehicle-working device combination 3 in accordance with the present disclosure. The working vehicle-working device combination 3 comprises a working vehicle 1, a working device 2 and a part system 4 that is embodied as a drawbar 16.

The working vehicle 1 is an agricultural vehicle in the form of a tractor 12, wherein the fundamental construction of a tractor is assumed to be known to the person skilled in the art. A working vehicle 1 in the sense of the present disclosure may be any vehicle that may be used for construction work or for agricultural work such as, for example, a tractor, a telescopic handler or a construction machine.

The working vehicle 1 comprises a driver cabin for receiving an operator, wherein an operating terminal for operating the tractor is arranged within the driver cabin. The tractor comprises multiple ground-engaging means 5 that are arranged on front and rear axles 6. The multiple ground-engaging means 5 are in the form of air-filled wheels which are in engagement with ground in order to transmit driving forces. The ground-engaging means 5 are driven by a motor, which is embodied in the form of an internal combustion engine, and a transmission that cooperates with the internal combustion engine.

An output torque of the transmission is transmitted via a drivetrain, which is illustrated schematically, to the ground engaging means 5, wherein the illustrated tractor 12 is an all-wheel drive vehicle.

As illustrated, the part system 4 is used for the purpose of coupling the working device 2 to the working vehicle 1 or adjusting the working device with the result that the working vehicle 1 may pull the working device 2 into motion (for example, towing) or may perform a specific task. In the present embodiment, the working vehicle 1 provides the propulsion force in order to pull the working device 2 if the working device 2 is performing the task. In another embodiment, the working vehicle 1 maypush the working device 2.

In FIG. 1, the working device 2 is a pull-type scraper 10. However, the working device 2 may be any arbitrary working device 2 that is attached to the working vehicle 1 and that includes a portion thereof, a tool or any other mechanism or device that engages the ground under the implement. The part system 4 may also be used with any combination of working vehicle 1 and working device 2.

As illustrated, the part system 4 is used for the purpose of coupling the working device 2 to the working vehicle 1 and/or adjusting the working device 2 with the result that the working vehicle 1 may pull the working device 2 into motion (for example, towing) or may perform a specific task. In the present embodiment, the working vehicle 1 provides the propulsion force in order to pull the working device 2 if the working device 2 is performing the task. In another embodiment, the working vehicle 1 may push the working device 2.

In FIG. 1, the work vehicle 1 is depicted as a tractor 12 that may at least partially implement a draft control system 212 associated with a powertrain 14 (shown schematically). It will be understood, however, that other configurations of the vehicle 1 may be possible, including configurations with the vehicle 1 as a different kind of tractor, a harvester, a log skidder, a grader, or one of various other work vehicle types. It will further be understood that the disclosed powertrains 14 may also be used in non-work vehicles and non-vehicle applications (e.g., fixed-location power installations).

Generally, the powertrain 14 may be configured to generate power and to transmit the power from one or more power sources (e.g., engines, motors, and/or other power sources, as discussed below) to an output member (e.g., an output shaft). In some embodiments, the powertrain 14 may transmit the power to rear and/or front axles 6 of the work vehicle 1. The powertrain 14 may further be configured to deliver power to a power take-off shaft for powering an implement that is supported on the vehicle 1 or that is supported on a separate vehicle. It will be appreciated that the powertrain 14 may be configured for delivering power to other power sinks without departing from the scope of the present disclosure.

In one example, the work vehicle 1 includes a vehicle control system 218 (or multiple controllers) to control one or more aspects of the operation of the work vehicle 1, and in some embodiments, facilitate implementation of the draft control system 212. For example, the vehicle control system 218 may include and/or be associated with the draft control system 212 for implementing the functions of the draft control system 212. In one example, the vehicle control system 218 and the draft control system 212 may be implemented with processing architecture such as a processor 220 and a non-transitory memory device 221 operatively coupled with the processor 220. In the example embodiment the memory device 221 stores draft control logic 219, wherein the draft control logic 219 is executable by the processor to implement the functions described herein based on programs, instructions, and data stored in the memory device 221 in the draft control logic 219 or in one or more other forms.

Therefore, in one example, the vehicle control system 218 and the draft control system 212 are provided in a common or shared control platform context including for example a shared processor, a shared memory device, and vehicle control and overload protection logic modules stored in the processor that are executable by the processor to perform vehicle control functions including transmission overload protection functions and others, and wherein signals such as engine speed and/or torque setpoint signals developed by the combined vehicle control system 218 and draft control system 212 are developed as necessary or desired, including being developed cooperatively for example, to control an amount of draft force imposed upon a tractor by a ground engaging implement by modifying the working depth of the implement based on a draft force that is sensed internally within an eCVT of the tractor. In another example, the vehicle control system 218 may be separate from and in operative communication with the draft control system 212 wherein signals such as engine speed and/or torque setpoint signals developed by the vehicle control system 218 may be modified by the draft control system 212 as necessary or desired to control the draft force imposed upon a tractor by a ground engaging implement.

As such, the control systems 218, 212 may be configured as one or more computing systems with associated processor devices and memory architectures, as a hard-wired computing circuit (or circuits), as a programmable circuit, as a hydraulic, electrical or electro-hydraulic controller, or otherwise. The control systems 218, 212 may be configured to execute various computational and control functionality with respect to the work vehicle 1 (or other machinery). In some embodiments, the control systems 218, 212 may be configured to receive input signals in various formats (e.g., as hydraulic signals, voltage signals, current signals, digital data signals, and so on), and to output command signals in various formats (e.g., as hydraulic signals, voltage signals, current signals, digital data signals, mechanical movements, and so on).

The control systems 218, 212 may be in electronic, hydraulic, mechanical, or other communication with various other systems or devices of the work vehicle 1 (or other machinery). For example, the control systems 218, 212 may be in electronic or hydraulic communication with various actuators, sensors, and other devices within (or outside of) the work vehicle 1, including various devices described below. The control systems 218, 212 may communicate with other systems or devices (including other controllers) in various known ways, including via a CAN bus (not shown) of the work vehicle 1, via wireless or hydraulic communication mechanisms, or otherwise.

In some embodiments, the control systems 218, 212 may be configured to receive input commands from, and to interface with, an operator via a human-vehicle operator interface 23 that enables interaction and communication between the operator, the vehicle 1, and the draft control system 212. The operator interface 23 may be disposed inside a cab of the work vehicle 1 for easy access by the vehicle operator. The operator interface 23 may be configured in a variety of ways. In some embodiments, the operator interface 23 may include an input device with one or more joysticks, various switches or levers, one or more buttons, a touchscreen interface that may be overlaid on a display, a keyboard, a speaker, a microphone associated with a speech recognition system, or various other human-machine interface devices. The operator interface 23 also includes the display device, which can be implemented as a flat panel display device or other display type that is integrated with an instrument panel or console of the work vehicle 1.

As one example, the operator interface 23 generally includes a number of devices for operating the vehicle 1, such as speed and mode selection devices for the powertrain 14. In further examples, the display device of the operator interface 23 may function to render vehicle usage information such current draft force information, tool depth information, and other information generated by the draft control system 212 for display to the vehicle operator.

The work vehicle 1 further includes a vehicle communication component 25 enables communication between the operator, the control systems 218, 212, and an associated based station (not shown). The vehicle communication component 25 includes any suitable system for receiving and transmitting data, directly or through a network. For example, the communication component 25 may include a radio or suitable transceiver configured to receive and send data transmitted by modulating a radio frequency (RF) signal via a cellular telephone network according to the long-term evolution (LTE) standard, although other techniques may be used. The communication component 25 may achieve bi-directional communications over Bluetooth® or by utilizing a Wi-Fi standard, i.e., one or more of the 802.11 standards as defined by the Institute of Electrical and Electronics Engineers ("IEEE"), as is well known to those skilled in the art. Generally, the communication component 25 may include a Bluetooth® transceiver, a radio transceiver, a cellular transceiver, an LTE transceiver and/or a Wi-Fi transceiver.

The work vehicle 1 further includes various sensors 27 that function to collect information about the work vehicle 1. Such information may be provided to the control systems 218, 212 and/or the communication component 25 for potential transmission and/or use by the draft control system 212. As examples, the sensors 27 may include operational sensors associated with the vehicle systems and components discussed above, including engine and transmission sensors, fuel sensors, and battery sensors. In one example, the sensors 27 may include one or more speed and/or torque sensors associated with the transmission of the powertrain 14, particularly one or more speed and/or torque sensors associated with an input shaft, one or more transmission shafts, and/or one or more output shafts. In some examples, the sensors 27 may be omitted. In an example embodiment, a signal representative of the torque delivered to the ground-engaging means 5 is generated internally. That is, in accordance with an example embodiment, a signal representative of the torque delivered to the ground-engaging means 5 by the powertrain 14 is generated within the eCVT.

As introduced above, the vehicle 1 is configured, based on commands from the vehicle controller 218, to perform various work tasks. For example, the vehicle control system 218 generates commands for the powertrain 14 (e.g., engine, motors, transmission) based on operating conditions and inputs via the operator interface 23. As described in greater detail below, the draft control system 212 may collect information associated with the powertrain 14, particularly the transmission and motors, and generate usage and control information associated with various components of the powertrain 14 that represent the power being applied to the various powertrain components. The usage information, such as in the form of usage values or levels, may be provided to the operator (e.g., displayed on a display device of the operator interface 23) and/or transferred via the vehicle communication component 25 to the associated based station (not shown).

In accordance with an aspect, the draft control system generates one or more signals controlling an electro-hydraulic system 740 of the tractor based on a sensed draft force to modify the working depth of the implement 2 by raising and/or lowering the implement using the electro-hydraulic system 730 of the tractor, wherein the draft force is sensed internally within an electric infinitely/continuously variable transmission (eCVT) of the tractor.

In accordance with an aspect, the draft control system generates one or more signals controlling a hitch 300 (FIG. 3) of the tractor based on the sensed draft force to modify the working depth of the implement 2 by raising and/or lowering a hitch 300 attaching the implement with the tractor, wherein the draft force is sensed internally within the eCVT of the tractor. In an example implementation, the hitch may be raised and/or lowered by the electro-hydraulic system 730 of the tractor in response to the one or more signals from the draft control system.

In accordance with an aspect, the draft control system generates one or more signals controlling one or more selective control valves (SCVs) of the tractor based on the sensed draft force to modify the working depth of a drawbar-attached implement 2, wherein the draft force is sensed internally within an eCVT of the tractor. In an example implementation, the working depth of a drawbar-attached implement may be increased and/or decreased by an electro-hydraulic system 730 of the tractor activating the one or more SCVs in response to the one or more signals from the draft control system.

In accordance with an aspect, the draft control system generates one or more signals controlling one or more electrical power systems (not shown) off-board of the tractor based on a sensed draft force to modify the working depth of the drawbar-attached implement 2, wherein the draft force is sensed internally within the eCVT of the tractor. In an example implementation, the working depth of the drawbar-attached implement may be increased and/or decreased by an electro-hydraulic system 730 of the tractor activating the one or more off-board power systems in response to the one or more signals from the draft control system.

With continued reference to FIG. 1 and as described above, the illustrated example implement 2 is in the form of a pull-type scraper 10 towed by the tractor 12. The scraper 10 is preferably a conventional commercially scraper, such as a John Deere model 1810 fixed-blade ejector scraper. Such a scraper 10 includes a relatively fixed front frame 11 attached to a forward extending tongue 14 which is coupled to a drawbar 16 of the tractor 10. The scraper 10 also includes a rear frame 15 which has an aft end supported by ground engaging wheels 18 and which is pivotally coupled to the front frame 11 at pivot 13. The scraper 10 also includes a blade 20 which projects from the bottom of a gate 22 which is fixed relative to rear frame structure 15.

The gate 22 and the blade 20 are raised and lowered by blade lift cylinders 26. A blade position sensor 28 on the scraper 10 senses the position or angle of the blade 20 with respect to the front frame 11. It is to be appreciated however, that the gate 22 and/or the blade 20 may be raised and/or lowered by electromechanical blade lift mechanisms such as by electrical control systems located on-board the implement.

Figure 2:
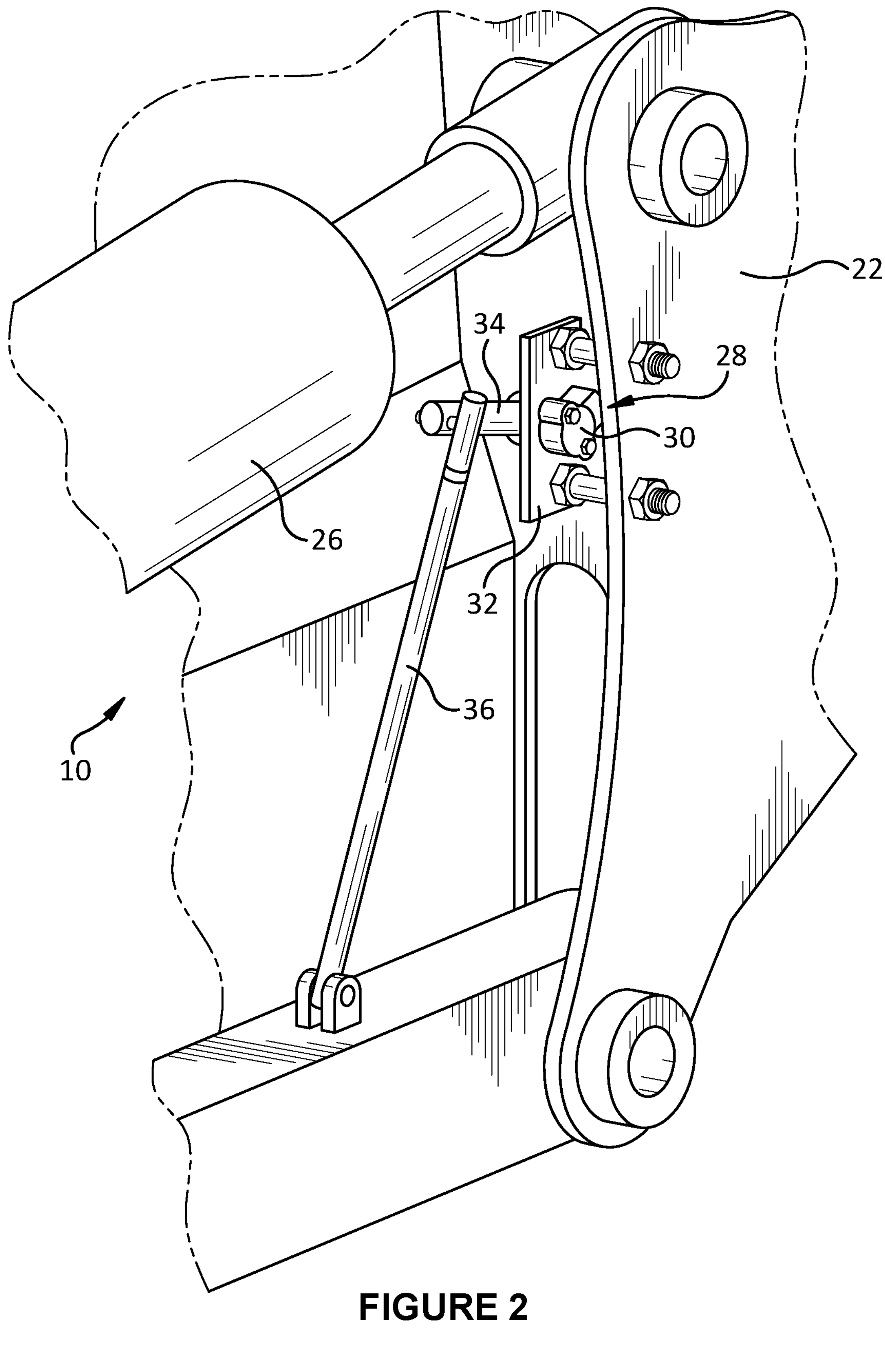
FIG. 2 is a perspective view of a blade position sensor that is mounted on the implement of FIG. 1.

As best seen in FIG. 2, the blade position sensor unit 28 includes a rotary position sensor 30 mounted on a plate 32 which is fixed to a part of the rear frame 15. A sensing arm 34 projects from the sensor 30, and a rod 36 connects the arm to a part (not shown) of the front frame 11. As the blade 20 and gate structure 22 move with respect to the front frame 11, the rod 36 pivots arm 34 which in turn imparts a rotary input to sensor 30. The blade 20 will be raised when cylinder 26 is extended and lowered when cylinder 26 is retracted. A vehicle speed sensor 41, such as a commercially available radar speed sensing unit, is mounted on the tractor 12.

Figure 3:
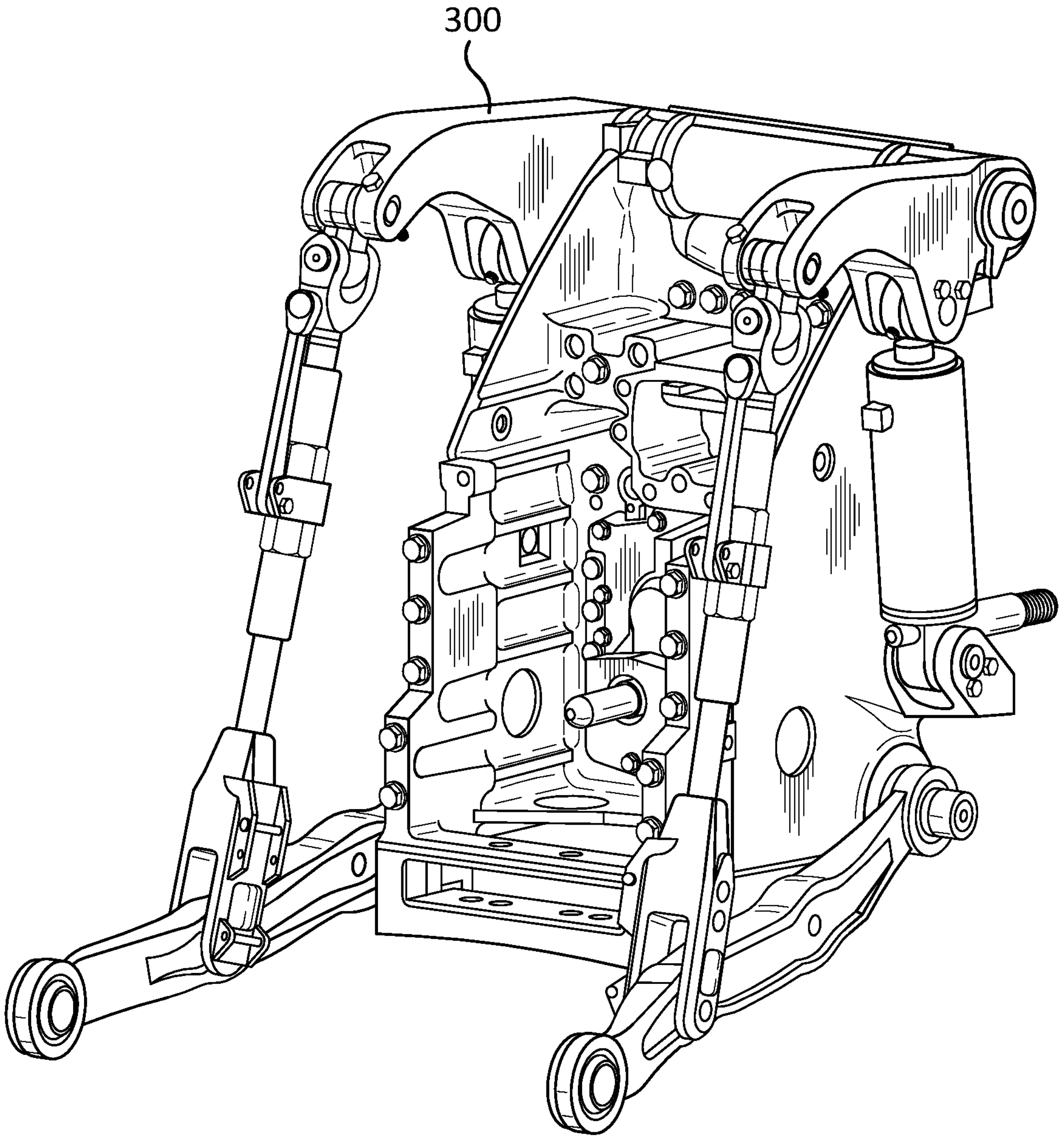
FIG. 3 is a perspective view of a three-point hitch configured to be mounted on the tractor of FIG. 1 and operable to support a hitch-mounted ground engaging implement according to an example embodiment of the present disclosure.

Referring to FIG. 3, there is shown a perspective view of a three-point hitch 300. The three-point hitch 300 may be part of a work machine, such as an agricultural tractor or an industrial work machine, and it may be used to mount implements to the work machine. The three-point hitch 300 may include a rocker shaft, a left rocker arm, a right rocker arm, a left lift cylinder, a right lift cylinder, a left lift link assembly, a right lift link assembly, a left draft link, a right draft link, and an upper link (not shown so as to highlight the other components of the three-point hitch 300).

An end of the left rocker arm may be coupled to an end of the rocker shaft, and an end of the right rocker arm may be coupled to an opposite end the rocker shaft.

A first end of the left lift link assembly may be rotatably coupled to an opposite end of the left rocker arm, and a second end of the left lift link assembly may be rotatably coupled to the left draft link. A first end of the right lift link assembly may be rotatably coupled to an opposite end of the right rocker arm, and a second end of the right lift link assembly may be rotatably coupled to the right draft link. The left lift link assembly may include a left rotatable length adjuster, and likewise the right lift link assembly may include a right rotatable length adjuster.

An end of the left lift cylinder may be rotatably coupled to a housing of the work machine, and an opposite end of the left lift cylinder may be coupled to the left rocker arm. An end of the right lift cylinder may be rotatably coupled to the housing, and an opposite end of the right lift cylinder may be coupled to the right rocker arm.

The upper link (not shown) is positioned laterally between the lift link assemblies and is rotatably coupled to the housing of the work machine.

The implement is mounted to the left draft link, the right draft link, and the upper link. When the lift cylinders extend outwards, the rocker arms, the lift link assemblies, the draft links, and the implement (if mounted) rotate upwards. In contrast, when the lift cylinders retract inwards, the rocker arms, the lift link assemblies, the draft links, and the implement (if mounted) rotate downwards.

In some embodiments of the three-point hitch 300, such as in the embodiment shown in FIG. 3, the lift link assemblies may be identical to one another.

Figure 4:
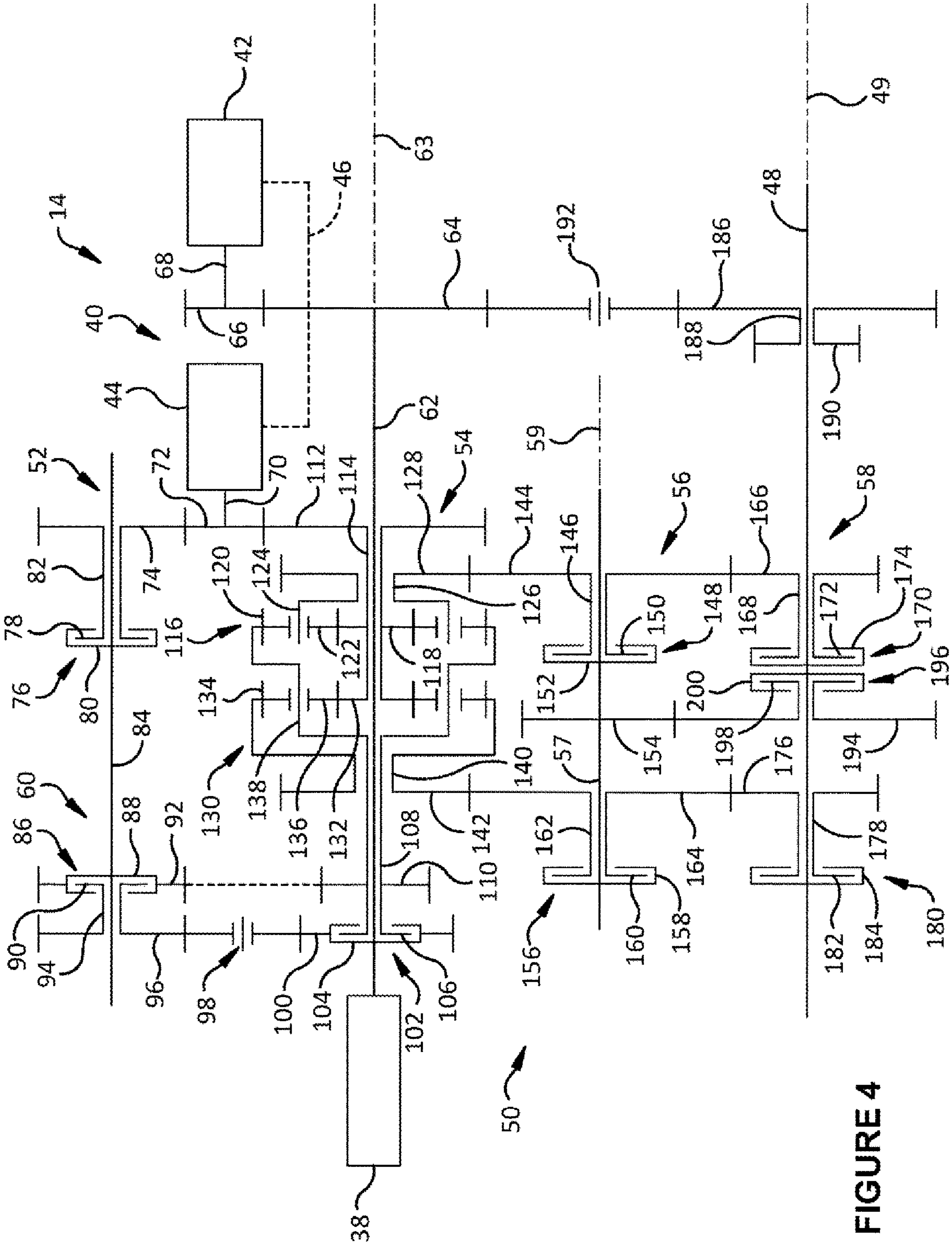
FIG. 4 is a schematic view of a multi-mode continuously variable transmission (CVT) of the work vehicle of FIG. 1 according to an example embodiment of the present disclosure.

Referring now to FIG. 4, an example configuration of the powertrain 14 is depicted schematically. The powertrain 14 may include an engine 38, which may be an internal combustion engine of various known configurations. The powertrain 14 may also include a continuously variable power source (CVP) 40. The CVP 40 may include at least one continuously variable machine (CVM), such as an electrical machine or a hydraulic machine. In the embodiment shown, the CVP 40 includes a first CVM 42 and a second CVM 44. As shown in FIG. 4, the first CVM 42 may be operably connected to the second CVM 44 via a conduit 46, such as one or more electrical wires.

The powertrain 14 may also include an output shaft 48 or other output member defining an output axis 49. The output shaft 48 may comprise or may be directly connected to one or more power sinks (e.g., one or both axles 6, power take-off ("PTO") shafts, and so on) of the vehicle 1. In certain embodiments, a torque converter or other device may be included between the engine 38 and the output shaft 48 (or another shaft (not shown)), although such a device is not necessary for the operation of the powertrain 14, as contemplated by this disclosure. Further, in certain embodiments, multiple shafts (not shown), including various shafts interconnected by various gears or other power transmission components, or equivalent power transmission components (e.g., chains, belts, and so on) may be included.

The work vehicle traction force is provided through the powertrain 14 to one or more wheels, tracks, or other work vehicle ground-engaging member(s) 5. The powertrain 14 includes an output shaft 48 having a shaft speed and a shaft torque. In an embodiment, such as that having the eIVT, the operation of the eIVT may allow measurement, determination, and/or the providing of the shaft speed or shaft torque of the output shaft 48. Further, the powertrain 14, such as the eIVT in the present embodiment, includes one or more motor generator components. As explained in further detail below, a torque at the output shaft 48 of the transmission 14 is determined in an embodiment using a current passing through the motor generator component of the eIVT. The transmission 50 of an embodiment is a multi-mode transmission.

As noted above, the powertrain 14 may further include a transmission 50 for transferring power between the engine 38, the CVP 40, and the output shaft 48. The transmission 50 may include a plurality of components, such as shafts, gears, gearsets, clutches, brakes, and/or other components that interconnect the engine 38, the CVP 40, and the output shaft 48 as will be discussed in detail below. The transmission 50 may be equivalently considered an electric continuously variable transmission ("eCVT") or an electric infinitely variable transmission ("eIVT"). Also, the transmission 50 may be configured to provide selection between one of the plurality of transmission modes to vary the speeds and power flow paths.

Accordingly, the engine 38 may provide rotational power to the output shaft 48 via the transmission 50. The engine 38 may also provide rotational power to the first CVM 42 via the transmission 50. Continuing, the first CVM 42 may convert the received power to an alternate form (e.g., electrical or hydraulic power) for transmission over the conduit 46. This converted and transmitted power may be received by the second CVM 44 and then re-converted by the second CVM 44 to provide a rotational power output. Various known control devices (not shown) may be provided to regulate such conversion, transmission, re-conversion and so on.

In some embodiments, the first CVM 42 and the second CVM 44 are both electrical machines. Also, in some embodiments, the first and/or second CVMs 42, 44 may be configured to operate as a motor (to output mechanical power from electrical input power) and as a generator (to output electrical power from mechanical input power).

Generally, in some embodiments, the transmission 50 may include an input assembly 52 with an input shaft 62 to which the engine 38 is mounted and that defines an input or engine axis 63. In this example, the input assembly 52 may further include a further transmission shaft 84, spaced apart from the input shaft 62 and selectively coupled to the input shaft 62, as discussed in greater detail below. The input assembly 52 may include at least one component (an input transmission component) that is supported for rotation to facilitate transmission of power, as discussed below. As will be also discussed below, the engine 38 and the CVP 40 may be operatively connected to the input assembly 52.

The transmission 50 may also include a variator 54 at least partially mounted about the input shaft 62 such that, in this example, a central variator axis is coincident with the input axis 63. The variator 54 includes at least one component (a variator component) to facilitate transmission of power from the input assembly 52.

Thus, the variator 54 is operably connected to the engine 38 and the CVP 40. Generally, the variator 54 may include a variety of devices capable of summing the mechanical inputs from the engine 38 and the CVP 40 for a combined mechanical output to the output shaft 48 for split-path power transmission. In certain embodiments, as depicted in FIG. 4, the variator 54 may be configured as summing planetary gearsets (e.g., a double planetary gearset). It will be understood, however, that other configurations may be possible.

The transmission 50 may further include countershaft assembly 56 with a countershaft 57 defining a countershaft axis 59 and including at least one component (a countershaft component) that is supported for rotation to transfer power from the variator 54. Furthermore, the transmission 50 may include an output assembly 58 with the output shaft 48 and including at least one component (an output component) to transfer power from the countershaft assembly 56 to the output axis 49.

Accordingly, in some embodiments, the variator 54 may be disposed between, and operatively connected to, the input assembly 52 and the countershaft assembly 56. Also, the countershaft assembly 56 may be disposed between, and operatively connected to, the variator 54 and the output assembly 58. As such, the transmission 50 may be configured to enable power flow through the transmission 50 along a path from the input assembly 52, through the variator 54 and the countershaft assembly 56, and to the output assembly 58.

Generally, the transmission 50 may be configured as a multi-mode transmission and may provide selective shifting between the different modes. For example, the transmission 50 may provide one or more split-path power transmission modes. In each of these modes, power from the engine 38 and the CVP 40 may be combined or summed (e.g., by the variator 54), and the resulting combined/summed power may be delivered to the output shaft 48. In one split-path mode, the output shaft 48 may be rotated within a first speed range, and in another split-path mode, the output shaft 48 may be rotated within a second speed range. The second speed range may be higher than the first speed range in some embodiments. There may be additional split-path modes providing other speed ranges for the output shaft 48 as well.

Additionally, the transmission 50 may provide one or more CVP-only modes. For example, in some embodiments, the transmission 50 may in a sense, disconnect the engine 38 from the output shaft 48 and instead deliver CVP power from the CVP 40 to the output shaft 48. In some embodiments, the speed range for the output shaft 48 during a CVP-only mode may be relatively low. For example, the transmission 50 may provide a CVP-only mode at which torque is maintained at the output shaft 48 while the output shaft 48 remains stationary (i.e., angular velocity of zero). This may be referred to as "powered zero". The output shaft 48 may be driven at relatively low speeds (i.e., "creeper speeds") as well in this CVP-only mode.

In accordance with embodiments of the present disclosure, the work vehicle traction force is determined using data from the transmission 50. As discussed above, the transmission 50 includes one or more motor generators, such as to perform a variator function in an eIVT. In additional embodiments, instead of or in addition to the motor generator, another motor, generator, and/or other component configured to receive a current is included in the transmission 50 to determine torque output in accordance with the present disclosure. In particular embodiments, the torque is determined, such as by an inverter 702 (FIG. 7) of the transmission, IVT, or eIVT in an embodiment, by correlating current usage to a torque output from the motors comprising the engine 38 and/or the CVP 40.

To account for mechanical losses, an output torque reduction factor may be applied in an embodiment to determine the corrected output torque.

The corrected motor torque of the present embodiment may be utilized with an axle ratio (transmission output shaft speed/axle speed) and a rolling radius of a tire or other ground-engaging member 5 of the work vehicle 12 to determine the work vehicle traction force.

In accordance with an aspect of this disclosure, an inverter 702 (FIG. 7) senses a current in one or more CVMs, wherein the sensed current is representative of a draft force of a working implement on a tractor.

In accordance with an aspect of this disclosure, an electronic control unit (ECU) determines transmission output torque from a sensed current in one or more CVMs. In an example implementation, the determined transmission output torque is representative of a draft force of a working implement on a tractor.

In accordance with an aspect of this disclosure, an ECU determines transmission output torque from a sensed current in one or more CVMs, wherein the determined transmission output torque is based or otherwise dependent upon one or more of a mode of the transmission, a gear of the transmission, a speed of the transmission, and/or a final gear ratio of the transmission.

In accordance with an aspect of this disclosure, an ECU determines drawbar or draft load from determined transmission output torque.

In accordance with an aspect of this disclosure, an ECU determines whether the determined draft load is between a lower threshold and an upper threshold.

The transmission 50 may further include a control set 60 with a plurality of selective transmission components for selecting between the different transmission modes. The selective transmission components of the control set 60 may include wet clutches, dry clutches, dog collar clutches, brakes, or other similar components that may selectively move between an engaged position and a disengaged position. More specifically, a representative selective transmission component may include a first member and a second member that may engage each other (i.e., fixedly attach together for rotation as a unit) and, alternatively, disengage from each other (i.e., detach to allow relative rotation between the two). Although not shown, the control set 60 may be connected to a known control system for controlling actuation of the individual transmission components. Accordingly, as will be discussed further, the transmission 50 may provide effective power transmission across a number of modes such that the powertrain 14 is highly efficient.

Accordingly, the components of the transmission 50 will now be discussed in detail according to an example embodiment. As shown, the engine 38 may be coupled to drive the input (or engine) shaft 62 that is supported for rotation about the input axis 63. A first gear 64 may be fixed for rotation on the input shaft 62 at an end opposite the engine 38. The first gear 64 may be enmeshed with a second gear 66. The second gear 66 may be fixed for rotation on a first CVM shaft 68 connected to the first CVM 42 for delivering mechanical power to the first CVM 42.

The second CVM 44 may be coupled to a second CVM shaft 70. The second CVM shaft 70 may be considered the output shaft of the second CVM 44 and may be driven in rotation about an axis that is spaced apart from and parallel to the input shaft 62, in this embodiment. A third gear 72 may be fixed for rotation on the second CVM shaft 70. The third gear 72 may be enmeshed with a fourth gear 74.

The transmission 50 may further include a first clutch 76 of the control set 60. The first clutch 76 may be referred to as a "creeper clutch" in some embodiments. The first clutch 76 may include at least one first member 78 and at least one second member 80 (e.g., first and second clutch plates). The first member 78 may be fixed for rotation with a first hollow shaft 82, which in turn supports the fourth gear 74. The second member 80 is fixed for rotation on the transmission shaft 84. The first hollow shaft 82, on which the first member 78 of the first clutch 76 is mounted, may surround and receive a portion of the transmission shaft 84, on which the second member 80 of the first clutch 76 is mounted.

The first clutch 76 may be configured to move between an engaged position in which the first and second members 78, 80 abut and engage, and a disengaged position in which the first and second members 78, 80 are separated from one another. For example, the first member 78 and the second member 80 engage together in the engaged position for rotation as a unit such that the second CVM shaft 70 of the second CVM 44 is rotationally coupled to transmission shaft 84 via the third gear 72, the fourth gear 74, and the first clutch 76. The first member 78 and the second member 80 may disconnect for independent rotation in the disengaged position to, in effect, cut off this power flow path.

The transmission 50 may additionally include a second clutch 86 of the control set 60. The second clutch 86 may be referred to as a "reverse clutch" in some embodiments. Like the first clutch 76, the second clutch 86 may include at least one first member 88 and at least one second member 90. The first member 88 of the second clutch 86 may be fixed to the transmission shaft 84 for mutual rotation. Moreover, a fifth gear 92 may be mounted to the first member 88 of the second clutch 86 for mutual rotation as a unit with the transmission shaft 84. The second member 90 may be fixed on an end of a second hollow shaft 94 that receives and circumscribes the transmission shaft 84. A sixth gear 96 is mounted on the second hollow shaft 94 on a side opposite the second member 90 of the second clutch 86.

As above, the second clutch 86 may be configured to move between an engaged position in which the first and second members 88, 90 abut and engage, and a disengaged position in which the first and second members 88, 90 are separated from one another. As such, the second clutch 86 may engage to allow power transmission between the transmission shaft 84 and the sixth gear 96. The first and second members 88, 90 may disengage to cut off this power flow.

The sixth gear 96 may be enmeshed with an idler gear 98. The idler gear 98, in turn, may be enmeshed with a seventh gear 100, as discussed below.

The transmission 50 may include a third clutch 102 of the control set 60. The third clutch 102 may be referred to as a "forward clutch" in some embodiments. Like the above-described clutches, the third clutch 102 may include at least one first member 104 and at least one second member 106. The first member 104 of the third clutch 102 may be fixed to the seventh gear 100 for rotation about the axis of the input shaft 62. The second member 106 may be fixed to an end of a third hollow shaft 108. The first member 104 and the second member 106 of the third clutch 102 may engage to allow power transmission between the seventh gear 100 and the third hollow shaft 108. The first and second members 104, 106 of the third clutch 102 may disengage to cut off this power transmission path.

Additionally, an eighth gear 110 may be fixed on the third hollow shaft 108. The eighth gear 110 may be enmeshed with the fifth gear 92. The third hollow shaft 108 generally circumscribes the input shaft 62 and includes a first end that forms the second member 106 of the third clutch 102 and a second end that is coupled to the variator 54, as described below.

The transmission 50 may include a ninth gear 112 that may be fixed on an end of a fourth hollow shaft 114. The hollow shaft 114 may receive the input shaft 62, and both the ninth gear 112 and the hollow shaft 114 may be supported for selective rotation as a unit relative to the input shaft 62. The ninth gear 112 may be enmeshed with the third gear 72 coupled to the second CVM 44. The fourth hollow shaft 114 may also be operatively attached to the variator 54 as will be discussed.

In this example, the variator 54 may include a double planetary gearset. However, it will be appreciated that the variator 54 may vary from the illustrated embodiment without departing from the scope of the present disclosure. Furthermore, it will be appreciated that the variator 54 may include a plurality of variator members, some of which may serve as power inputs and some of which may serve as power outputs, depending on the mode in which the transmission 50 is operating.

In the illustrated embodiment, for example, the variator 54 may include a first planetary gearset 116 (a low planetary gearset) having a first sun gear 118, a first ring gear 120, and a plurality of first planet gears 122 with an associated first carrier 124. The first sun gear 118 may be fixed to the shaft 114 for rotation about the variator (and input) axis 63. The first planet gears 122 may enmeshed with and disposed between the first sun gear 118 and the first ring gear 120. The first planet gears 122 and the first carrier 124 may be configured to rotate together about the variator (and input) axis 63.

In addition, the variator 54 may include a first output member formed by a hollow first output member shaft 126 and a tenth (or first output member) gear 128 mounted on the first output member shaft 126. The first output member shaft 126 receives the hollow shaft 114 and the input shaft 62 and is further fixed to the first carrier 124 for rotation therewith about the variator (and input) axis 63.

Moreover, the variator 54 may include a second planetary gearset 130 (a high planetary gearset) having a second sun gear 132, a second ring gear 134, and a plurality of second planet gears 136 with an associated second carrier 138. The second sun gear 132 may be fixed to the shaft 114 for rotation about the variator (and input) axis 63. The second planet gears 136 may be enmeshed with and disposed between the second sun gear 132 and the second ring gear 134. The second planet gears 136 and the second carrier 138 may be configured to rotate together about the variator (and input) axis 63. The second carrier 138 may also be attached to the first ring gear 120. Likewise, the second ring gear 134 may be centered on and supported for rotation about the variator (and input) axis 63. In some embodiments, the second carrier 138 may be fixed to the third hollow shaft 108. The opposite portion of the second carrier 138 may be fixed to the first ring gear 120.

The variator 54 may also include a second output member formed by short, hollow second output member shaft 140 and an eleventh (or second output member) gear 142 mounted on the second output member shaft 140. The second output member shaft 140 is hollow and receives the input shaft 62 and hollow shaft 108. The second output member shaft 140 may be fixed to the second ring gear 134 for rotation therewith about the variator (and input) axis 63. In some embodiments, the second output member gear 142 may be disposed axially between the second planetary gearset 130 and the third clutch 102 with respect to the variator (and input) axis 63.

It is noted that the first clutch 76, the second clutch 86, and the third clutch 102 may be disposed on an input side of the variator 54. Thus, during operation of the powertrain 14, power (from the engine 38 and/or the CVP 40) may be input to the variator 54 via one or more of these clutches 76, 86, 102. The variator 54 may output power via the components that are described below.

In this example, the transmission 50 may include a twelfth gear 144. The twelfth gear 144 may be supported for rotation about the countershaft axis 59. For example, the twelfth gear 144 may be fixed on an end of a hollow shaft 146, which is centered on the countershaft axis 59.

Additionally, the transmission 50 may include a fourth clutch 148 of the control set 60. The fourth clutch 148 may be referred to as a "first range clutch" in some embodiments. Like the above-described clutches, the fourth clutch 148 may include at least one first member 150 and at least one second member 152. The first member 150 may be fixed to the hollow shaft 146 for rotation about the countershaft axis 59, and the second member 152 may be fixed to the countershaft 57. The countershaft 57 may be received within the hollow shaft 146. The first member 150 of the fourth clutch 148 may engage the second member 152 to allow power transmission from the hollow shaft 146 to the countershaft 57. The first and second members 150, 152 may alternatively disengage to cut off this power transmission path.

The transmission 50 may further include a thirteenth gear 154. The thirteenth gear 154 may be referred to as a "drive gear" in some embodiments. The thirteenth gear 154 may be fixed to the countershaft 57 for rotation therewith about the countershaft axis 59.

Additionally, the transmission 50 may include a fifth clutch 156 of the control set 60. The fifth clutch 156 may be referred to as a "second range clutch" in some embodiments. Like the above-described clutches, the fifth clutch 156 may include at least one first member 158 and at least one second member 160. The first member 158 may be fixed to the countershaft 57 for rotation about the countershaft axis 59. The second member 160 may be fixed to an end of a hollow shaft 162. The second member 160 and the hollow shaft 162 may be supported for rotation about the countershaft axis 59. The first member 158 and the second member 160 of the fifth clutch 156 may engage to allow power transmission from the hollow shaft 162 to the countershaft 57. The first and second members 158, 160 may alternatively disengage to cut off this power transmission path.

The transmission 50 may further include a fourteenth gear 164. The fourteenth gear 164 may be fixed to the hollow shaft 162 on an end that is opposite that of the fifth clutch 156. The fourteenth gear 164 may also be engaged with the second output member gear 142.

Additionally, the transmission 50 may include a fifteenth gear 166. The fifteenth gear 166 may be enmeshed with the twelfth gear 144 and may be fixed to one end of a hollow shaft 168. The hollow shaft 168 may receive the output shaft 48. The hollow shaft 168 and the fifteenth gear 166 be centered on the output axis 49 and may be supported for rotation about the output axis 49.

Additionally, the transmission 50 may include a sixth clutch 170 of the control set 60. The sixth clutch 170 may be referred to as a "third range clutch" in some embodiments. Like the above-described clutches, the sixth clutch 170 may include at least one first member 172 and at least one second member 174. The first member 172 may be fixed to the hollow shaft 168 for rotation about the output axis 49. The second member 174 may be fixed to the output shaft 48. The first member 172 of the sixth clutch 170 may engage the second member 174 to allow power transmission from the hollow shaft 168 to the output shaft 48. The first and second members 172, 174 may alternatively disengage to cut off this power transmission path.

The transmission 50 may further include a sixteenth gear 176. The sixteenth gear 176 may be enmeshed with the fourteenth gear 164. The sixteenth gear 176 may also be fixed to a hollow shaft 178, which may be centered on the output axis 49 and which may be supported for rotation about the output axis 49. The hollow shaft 178 may receive the output shaft 48.

Additionally, the transmission 50 may include a seventh clutch 180 of the control set 60. The seventh clutch 180 may be referred to as a "fourth range clutch" in some embodiments. Like the above-described clutches, the seventh clutch 180 may include at least one first member 182 and at least one second member 184. The first member 182 may be fixed to the hollow shaft 178 for rotation about the output axis 49. The second member 184 may be fixed to the output shaft 48. The first member 182 and the second member 184 of the seventh clutch 180 may engage to allow power transmission from the hollow shaft 178 to the output shaft 48. The first and second members 182, 184 may alternatively disengage to cut off this power transmission path.

The transmission 50 may further include a seventeenth gear 186, a hollow shaft 188, and an eighteenth gear 190. The seventeenth gear 186 and the eighteenth gear 190 may be fixed on opposite ends of the hollow shaft 188. The hollow shaft 188 may receive the output shaft 48. The hollow shaft 188, the seventeenth gear 186, and the eighteenth gear 190 may be supported for rotation as a unit about the output axis 49. Also, the seventeenth gear 186 may be enmeshed with the first gear 64, directly or through a nineteenth (or idler) gear 192. Although not shown, the eighteenth gear 190 may be enmeshed with a gear to drive a power sink, such as a power take-off (PTO) shaft.

Furthermore, the transmission 50 may include a twentieth gear 194. The twentieth gear 194 may be enmeshed with the thirteenth gear 154. The twentieth gear 194 may also be operatively attached to an eighth clutch 196. Like the above-described clutches, the eighth clutch 196 may include at least one first member 198 and at least one second member 200. The first member 198 may be fixed to the twentieth gear 194 (via a hollow shaft or otherwise). The first member 198 and the twentieth gear 194 may receive the output shaft 48 and may be supported for rotation about the output axis 49. The second member 200 may be fixed to the output shaft 48. The first member 198 and the second member 200 of the eighth clutch 196 may engage to allow power transmission from the twentieth gear 194 to the output shaft 48. The first and second members 198, 200 may alternatively disengage to cut off this power transmission path.

In some embodiments, the control set 60 of the transmission 50 may provide selection between at least two modes chosen from the following group: 1) an all-CVP creeper mode (including powered-zero); 2) a lower speed split-path field mode; and 3) a higher speed split-path field mode. Each of these may be forward modes for drivingly rotating the output shaft 48 in a forward direction (i.e., for moving the work vehicle 1 forward). The transmission 50 may also provide one or more reverse modes for drivingly rotating the output shaft 48 in a reverse (opposite direction) (i.e., for moving the work vehicle 1 in reverse). Several example modes will be discussed in relation to the embodiment of FIG. 2.

In one example, the transmission 50 may provide the all-CVP creeper mode (i.e., series mode) when the first, fourth, and eighth clutches 76, 148, 196 are engaged and the second, third, fifth, sixth, and seventh clutches 86, 102, 156, 170, 180 are disengaged. Accordingly, engine power from the engine 38 may be transferred from the input shaft 62 to the first gear 64, to the second gear 66, and to the first CVM 42. The first CVM 42 may convert this mechanical input to electrical output for powering the second CVM 44. Meanwhile, the second CVM 44 may drive the second CVM shaft 70 and power may be transferred from the third gear 72, to the fourth gear 74, through the first clutch 76, to the transmission shaft 84, across the first member 88 of the second clutch 86, to fifth gear 92, to eighth gear 110, to the shaft 108, through the second carrier 138, and to the first ring gear 120. In addition, CVM power at the third gear 72 may simultaneously transfer to the ninth gear 112, to the hollow shaft 114, and to the first sun gear 118. Accordingly, CVM power from the second CVM 44 may re-combine at the first planet gears 122 to drive the first output member shaft 126 and first output member gear 128. The first output member gear 128 may output this power through the twelfth gear 144, to the hollow shaft 146, through the fourth clutch 148, to the countershaft 57, to the thirteenth gear 154, to the twentieth gear 194, through the eighth clutch 196, and to the output shaft 48. Thus, this mode of the transmission 50 provides power from the CVP 40 to the output shaft 48 and also disconnects the engine 38 from the output shaft 48 (i.e., eliminates the direct mechanical connection of the engine 38 such that the engine 38 is merely powering the generator of the first CVM 42).

The transmission 50 may provide a first split-path forward mode when the third, fourth, and eighth clutches 102, 148, 196 are engaged and the first, second, fifth, sixth, and seventh clutches 76, 86, 156, 170, 180 are disengaged. In this mode, engine power from the input shaft 62 may transfer through the third clutch 102, to shaft 108, to the second carrier 138, to drivingly rotate the first ring gear 120. Engine power may also drive the input shaft 62 and power may transfer to the first gear 64, to the second gear 66, to the first CVM shaft 68 in order to drive the first CVM 42. Electrical power may be generated for powering the second CVM 44. Mechanical power from the second CVM 44, via second CVM shaft 70) may drive the third gear 72, and this power may be transferred to the ninth gear 112, and to the shaft 114 in order to drive the first sun gear 118. The variator 54 may sum or combine the engine power (at the first ring gear 120) and the CVP power (at the first sun gear 118) and output combined power via the first planet gears 122 and associated first carrier 124 to drivingly rotate the first output member shaft 126 and first output member gear 128. The first output member gear 128 may transfer this power through the twelfth gear 144 to the hollow shaft 146, through the fourth clutch 148, to the countershaft 57, to the thirteenth gear 154, to the twentieth gear 194, through the eighth clutch 196, and to the output shaft 48. In some embodiments, the speed of the engine 38 may remain constant and the output speed of the second CVM 44 may vary in this mode.

The transmission 50 may additionally provide a second split-path forward mode when the third, fifth, and eighth clutches 102, 156, 196 are engaged and the first, second, fourth, sixth, and seventh clutches 76, 86, 148, 170, 180 are disengaged. In this mode, engine power from the input shaft 62 may transfer through the third clutch 102, to the shaft 108, and to the second carrier 138 in order to drivingly rotate the second planet gears 136. Engine power from input shaft 62 may also drive the first gear 64, and power may be transferred to the second gear 66, and to the first CVM shaft 68 in order to drive the first CVM 42. Electrical power may be generated for powering the second CVM 44. Mechanical power from the second CVM 44 (i.e., from the second CVM shaft 70) may drive the third gear 72, and this power may be transferred to the ninth gear 112, through the shaft 114, to drive the second sun gear 132. The variator 54 may sum or combine the engine power (at the second planet gears 136) and the CVP power (at the second sun gear 132) and output combined power via the second ring gear 134 to drivingly rotate the second output member shaft 140. The second output member shaft 140 may transfer this power through the second output member gear 142 to the fourteenth gear 164, through the fifth clutch 156, to the countershaft 57, to the thirteenth gear 154, to the twentieth gear 194, through the eighth clutch 196, and to the output shaft 48. In some embodiments, the speed of the engine 38 may remain constant and the output speed of the second CVM 44 may vary in this mode.

Furthermore, the transmission 50 may provide a third split-path forward mode when the third and sixth clutches 102, 170 are engaged and the first, second, fourth, fifth, seventh, and eighth clutches 76, 86, 148, 156, 180, 196 are disengaged. This mode may be substantially the same as the first split-path forward mode discussed above. The power flow path into the variator 54 may be the same, but the flow path out of the variator 54 may be different. Specifically, power at the first output member shaft 126 of the variator 54 may be transferred to the twelfth gear 144, to the fifteenth gear 166, to the hollow shaft 168, through the sixth clutch 170, and to the output shaft 48.

Moreover, the transmission 50 may provide a fourth split-path forward mode when the third and seventh clutches 102, 180 are engaged and the first, second, fourth, fifth, sixth, and eighth clutches 76, 86, 148, 156, 170, 196 are disengaged. This mode may be substantially the same as the second split-path forward mode discussed above. The power flow path into the variator 54 may be the same, but the flow path out of the variator 54 may be different. Specifically, power at the second output member shaft 140 and second output member gear 142 of the variator 54 may be transferred to the fourteenth gear 164, to the sixteenth gear 176, to the hollow shaft 178, through the seventh clutch 180, and to the output shaft 48.

Additionally, the transmission 50 may provide a plurality of reverse modes. In some embodiments, there may be a corresponding number of forward and reverse split-path modes. The control set 60 may provide the reverse modes similar to the forward modes discussed above, except that the second clutch 86 is engaged instead of the third clutch 102 in each. For example, a first split-path reverse mode may be provided when the second, fourth, and eighth clutches 86, 148, 196 are engaged and the first, third, fifth, sixth, and seventh clutches 76, 102, 156, 170, 180 are disengaged. Accordingly, engine power from the input shaft 62 may transfer through the seventh gear 100, to the idler gear 98, to the sixth gear 96, to the shaft 94, through the second clutch 86, through fifth gear 92, to the shaft 108, and to the second carrier 138 in order to drivingly rotate the first ring gear 120. Engine power may also drive the input shaft 62, and power may be transferred to the first gear 64, and to the first CVM shaft 68 in order to drive the first CVM 42.

Electrical power may be generated for powering the second CVM 44. Mechanical power from the second CVM 44 (i.e., from the second CVM shaft 70) may drive the third gear 72, and this power may be transferred to the ninth gear 112, through the shaft 114, to drive the first sun gear 118. As discussed above, the variator 54 may output combined power via the first planet gears 122 and associated first carrier 124 to drivingly rotate the first output member shaft 126. The first output member shaft 126 may transfer this power through the twelfth gear 144, through the fourth clutch 148, to the countershaft 57, to the thirteenth gear 154, to the twentieth gear 194, through the eighth clutch 196, and to the output shaft 48. The other reverse modes may be provided in a similar fashion.

Thus, the transmission 50 provides a plurality of modes that may be useful in different conditions. The operator may select between these different modes and/or the transmission 50 may automatically shift between these modes to maintain high operating efficiency in a number of different operating conditions.

Figure 5:
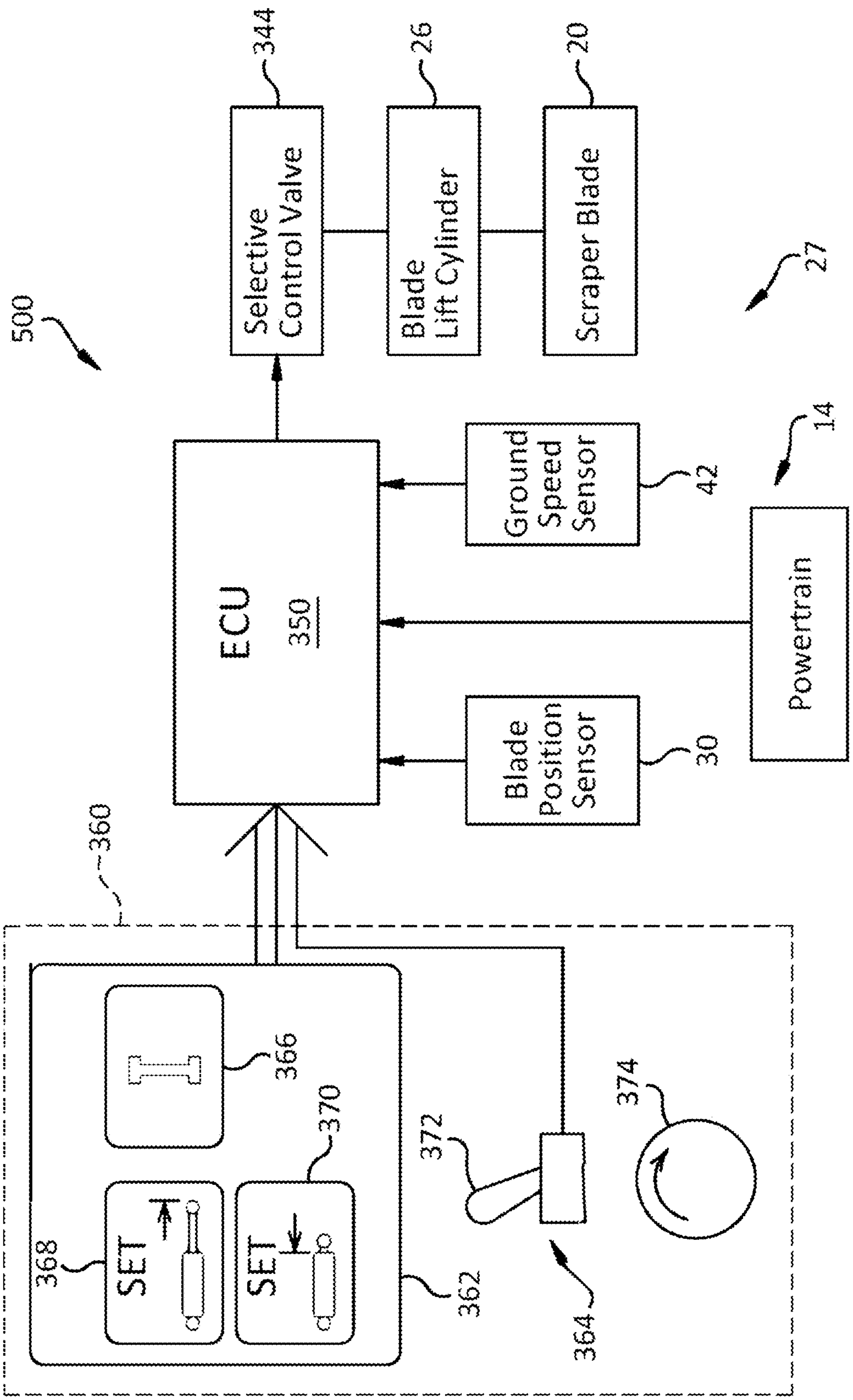
FIG. 5 is a schematic block diagram of a control system according to an example embodiment of the present disclosure.

FIG. 5 is a schematic block diagram of a draft control system 500 according to an example embodiment of the present disclosure. As described herein, the draft control system 500 operates to monitor the usage within the powertrain 14 and generate a signal controlling one or more SCVs of a tractor that is used to modify the working depth of a drawbar-attached implement based on a draft force that is sensed internally within an eCVT of the powertrain 14 of the tractor.

It is to be appreciated that although the control of SCVs are shown in the example implementation, in accordance with a further aspect of this disclosure and as described herein, a draft control system 500 is provided that generates a signal controlling a hitch of a tractor to modify the working depth of an implement by raising and lowering a hitch attaching the implement with the tractor based on a draft force that is sensed internally within an electric infinitely/continuously variable transmission (eCVT) of the powertrain 14 of the tractor.

In further addition, it is to be appreciated that although the control of SCVs are shown in the example implementation, in accordance with a further aspect of this disclosure and as described herein, a draft control system 500 is provided that a draft control system 500 is provided that generates one or more signals controlling an electro-hydraulic system 730 (FIG. 7) of a tractor based on a sensed draft force to modify the working depth of an implement 2 by raising and/or lowering the implement using the electro-hydraulic system 730 of the tractor, wherein the draft force is sensed internally within an electric infinitely/continuously variable transmission (eCVT) of the tractor.

Referring to FIG. 5, a draft control system 500 in accordance with an example implementation includes a microprocessor based electronic control unit (ECU) 350 which receives a blade position signal P from sensor 30, a draft force signal F from the powertrain 14, and a vehicle or ground speed signal S from sensor 42. ECU 350 also receives signals from operator controls 360 which includes a touch panel control unit 362 of the human-vehicle operator interface 23, and a selective control valve control lever unit 364, both of which are commercially available on production John Deere tractors. The touch panel control unit 362 includes a SCV (selective control valve) select button 366, an upper set point setting button 368 and a lower set point setting button 370. The commercially available SCV control lever 364 includes a lever 372 which is movable back and forth to cause SCV I to extend (raise) and retract (lower) the lift cylinder 26, is movable to a to a detent position, and is movable fully forward to float position. The operator controls 360 also include a rotary draft force or aggressiveness setting knob 374 so the operator can set a desired operating draft force or aggressiveness value F(desired), which the ECU 350 automatically adjusts depending upon the operating gear ratio and speed to compensate for the fact that at higher gear ratios the tractor 12 is limited in the amount of draft force or pulling force it can handle. The ECU 350 provides a valve control signal VC to the SCV 344. SCV 344 is connected by hydraulic lines to the lift cylinders 26. SCV 344 controls communication between lift cylinders 26 a conventional pump (not shown) and a conventional reservoir (not shown).

The ECU 350 is preferably programmed by the draft control logic 219 (FIG. 1) that is stored in the non-transitory memory device 221, and is executed by the processor 220 to perform a method of automatic blade depth control to generate a signal controlling the solenoid control valve (SCV) 344 of the tractor that is used to modify the working depth of a drawbar-attached implement based on a draft force that is sensed internally within an eCVT of the tractor. In a further embodiment, the ECU 350 is preferably programmed by the draft control logic 219 to perform a method of automatic blade depth control to generate a signal controlling a hitch of a tractor to modify the working depth of an implement by raising and lowering a hitch attaching the implement with the tractor based on a draft force that is sensed internally within an electric infinitely/continuously variable transmission (eCVT) of the tractor.

The scraper blade 20 can be raised and lowered between an upper mechanical stop position and a lower mechanical stop position, relative to the front frame 11.

While the scraper 10 and tractor 12 are stationary, the operator may press the first button 366 so that future inputs of the blade position signal P from sensor 30 and buttons 368 and 370 will be associated with and stored in connection with the operation of SCV 344. Then lever 372 is moved back to a rearward position, thus raising the blade 20 to a desired raised position, whereupon upper set point button 368 is pressed to cause the ECU 350 to store a current position signal from position sensor 30 as an upper position set point value, at or near the upper mechanical stop position.

Lever 372 may then be manipulated to cause SCV 344 to retract cylinder 26 and lower the blade 20 to a position just above and not engaging the surface of the ground, whereupon button 370 is pressed to store the current position from sensor 30 as a prepare to dig position set point value, corresponding to a desired position.

Lever 372 may then be manipulated to cause SCV 344 to lower the blade 20 slightly into the ground, and the lever 372 may be moved fully forward to its float position. Button 370 may then be pressed to cause the ECU to store a working position set point value Pw 81. Lever 372 is then moved full back to the detented position and released and the ECU 350 will raise the blade to its upper set point position, at or near the upper mechanical stop position.

Next, the tractor transmission (not shown) is placed in a working speed gear and the throttle (not shown) is moved fully forward so that the tractor 12 will move forward at the desired working speed.

Lever 372 is then pushed forward to its detent position and released. The ECU is programmed to automatically lower the blade 20 to the previously stored prepare to dig position. Lever 364 is then pushed forward again to its detent position and released. This start command will cause the ECU to automatically execute, according to the present invention, the method 600 of lowering the blade 20 to start a cutting operation while the scraper 10 and tractor 12 continue to move forward.

During the execution of this method, the tractor 12 pulls the scraper 10 at a selected target ground speed over terrain with the blade 20 positioned at the preset prepare to dig position, and the ECU 350 monitors the tractor ground speed from sensor 42 and monitors the sensed draft force from the powertrain 14. In response to a start command from the operator, the ECU 350 automatically causes cylinder 26 to lower the blade 20.

Thereafter, with the blade 20 fixed with respect to the scraper frame 11, the scraper 10 is pulled forward at the desired ground speed while the sensed draft force is monitored and compared to a stored draft force level which is a predetermined percentage of the draft force parameter set by the operator with knob 374. The draft force will be increasing because the blade 20 will be moving downward with respect to the surface of the ground (but fixed with respect to front frame 11).

When the sensed draft force increases to this stored draft force level, the ECU 350 automatically causes the blade 20 to raise with respect to the frame 11, preferably at a raising rate which is the same as the rate at which the wheels 18 are lowering as they descend along the cut produced by the blade 20 moving through the ground. Thus, the scraper will travel forward with the depth of blade 20 substantially fixed with respect to the ground. The ECU 50 will continue to raise the blade 20 with respect to the front frame 11 at this rate until the position of the blade 20 relative to the frame 11 reaches position 92 of FIG. 4, which will normally matches the position of the blade relative to the frame 11 represented by position 86 of FIG. 4, whereupon the ECU 50 will stop raising the blade 20. But, because the scraper wheels 18 are down in the cut, the blade 20 will be at some working position below the surface of the ground. This working position will generate a draft force approximately equal to the stored draft force level set by the operator with knob 374.

The scraper 10 is thereafter continued to be pulled forward by the tractor 12 at the desired working speed while the position of the blade 20 remains fixed with respect to scraper frame 11. The position of the blade 20 may be thereafter controlled in a closed loop manner in response to sensed draft force, engine speed and other parameters as is well known in the implement draft control field.

A similar blade lowering method could be applicable in a tandem towed scraper arrangement (not shown) where two scrapers are towed, one behind the other. Normally, when the front scraper is filled, its blade is lifted and the rear scraper blade then-continues the same cut as its blade reaches the end of the cut made by the front scraper. In the case of the rear scraper, the lowering of its blade at the second rate would be delayed until the blade of the rear scraper engages the ramp of soil left at the point where the blade of the front scraper was lifted.

Figure 6:
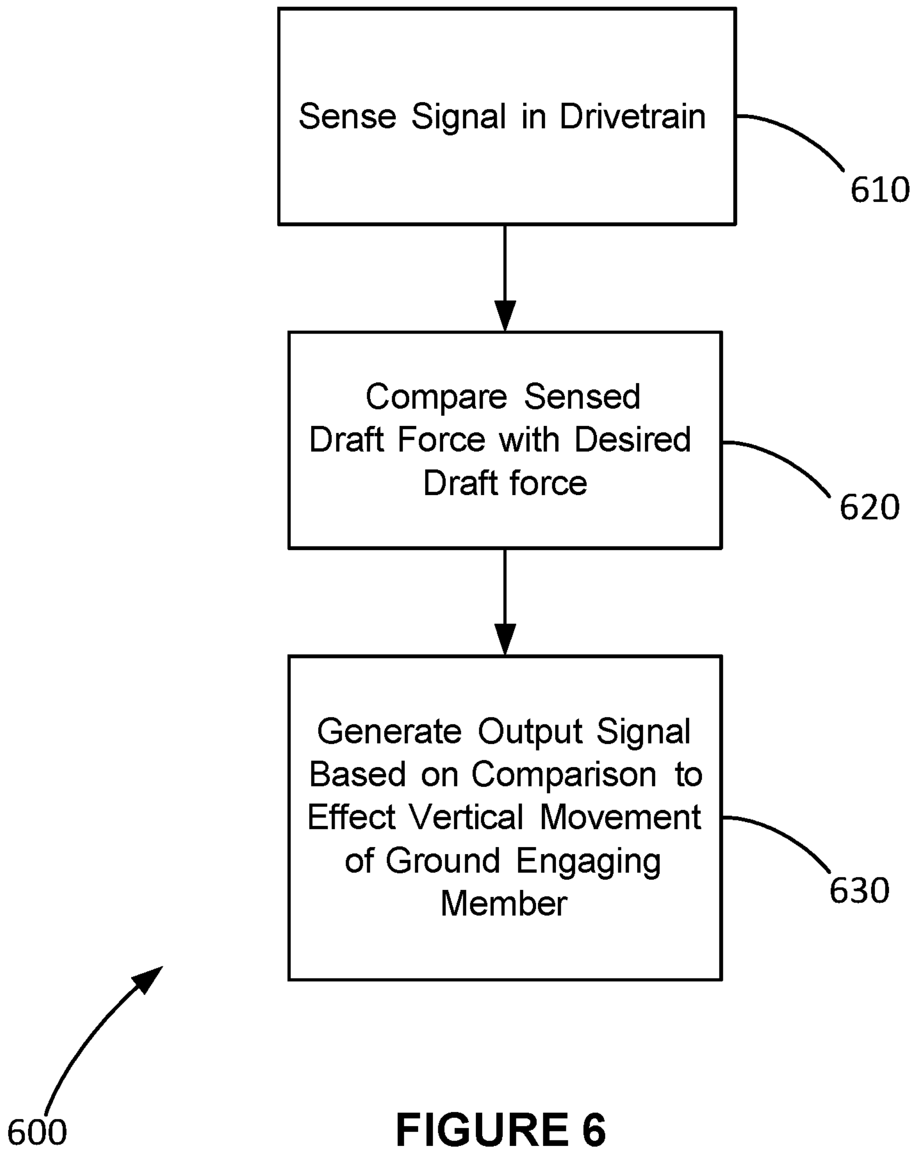
FIG. 6 is a logic flow diagram illustrating a method for controlling a draft force imposed upon a tractor by a ground engaging member of an implement attached with the tractor according to an example embodiment of the present disclosure.

With reference next to FIG. 6 a method 600 will be described for controlling a draft force imposed upon a tractor by a ground engaging member of an implement attached with the tractor.

In accordance with the example method 600, a signal in a drivetrain of the tractor is sensed at 610. In accordance with the example method 600, the signal in the drivetrain is representative of a sensed draft force imposed upon the tractor by the ground engaging member of the implement attached with the tractor. The signal in the drivetrain of the tractor may be an electrical signal such as a voltage or current signal representative of a sensed draft force imposed upon the tractor by the ground engaging member of the implement attached with the tractor. The drivetrain signal may also be a data signal representative of the sensed draft force, wherein the data representative of the sensed draft force may be communicated to the control systems 218, 212, 350 in various ways, including via a CAN bus (not shown) of the work vehicle 1, via wired and/or wireless communication mechanisms or networks, or otherwise.

The sensed electrical signal is representative of the sensed draft force which is compared at 620 with a desired draft force.

An output signal is generated at 630 based on a difference between the sensed current representative of the sensed draft force and the desired draft force. In accordance with the example method 600, the generated output signal effects a vertical movement of the ground engaging member of the implement relative to the ground.

In accordance with the example method 600, the sensing the electrical signal in the drivetrain of the tractor may comprise for example sensing the current in one or more electric continuously variable power sources (eCVPs) of the drivetrain. In accordance with an example method 600, the sensing the electrical signal in the drivetrain of the tractor may comprise for example sensing a voltage in one or more electric continuously variable power sources (eCVPs) of the drivetrain.

In accordance with the example method 600, the sensing the current in the one or more eCVPs may comprise averaging sensed current in a pair of eCVPs of the drivetrain.

In accordance with the example method 600, the sensing the current in the one or more eCVPs may sensing the current in the one or more eCVPs comprises summing sensed current in a pair of eCVPs of the drivetrain.

In accordance with the example method 600, the generating the output signal may comprise generating an electric solenoid control valve (SCV) output signal based on the difference between the sensed current representative of the sensed draft force and the desired draft force. In the example embodiment, the generated SCV output signal effects a control of an SCV operatively coupling the implement with the tractor thereby effecting the vertical movement of the ground engaging member of the implement relative to the ground.

In accordance with the example method 600, the generating the output signal comprises generating a hydraulic output signal based on the difference between the sensed current representative of the sensed draft force and the desired draft force. In the example embodiment, the generated hydraulic output signal effects a control of a three point hitch of the tractor carrying the implement, thereby effecting the vertical movement of the ground engaging member of the implement relative to the ground.

In accordance with a further example of the method 600, the draft control system comprises a sensor generating an inclination signal representative of the tractor traversing inclined terrain, wherein the draft control logic is executable by the processor device to determine a degree of inclination of the terrain based on the inclination signal, determine a terrain-compensated electrical signal by offsetting the sensed electrical signal by an amount corresponding to the determined degree of inclination of the terrain, and generate a terrain-compensated output signal based on a difference between the determined terrain-compensated electrical signal and the desired draft force, wherein the generated terrain-compensated output signal effects the vertical movement of the ground engaging member of the implement relative to the ground taking into account both the desired draft force and the determined degree of inclination of the terrain.

In accordance with a further example of the method 600, the draft control system comprises a sensor generating a declination signal representative of the tractor traversing declined terrain, wherein the draft control logic is executable by the processor device to determine a degree of declination of the terrain based on the declination signal, determine a terrain-compensated electrical signal by offsetting the sensed electrical signal by an amount corresponding to the determined degree of declination of the terrain, and generate a terrain-compensated output signal based on a difference between the determined terrain-compensated electrical signal and the desired draft force, wherein the generated terrain-compensated output signal effects the vertical movement of the ground engaging member of the implement relative to the ground taking into account both the desired draft force and the determined degree of declination of the terrain.

In accordance with a further example of the method 600, the draft control system comprises a sensor generating an acceleration signal representative of the tractor accelerating, wherein the draft control logic is executable by the processor device to determine an acceleration-compensated electrical signal by offsetting the sensed electrical signal by an amount corresponding to a degree of acceleration of the tractor, and generate an acceleration-compensated output signal based on a difference between the determined acceleration-compensated electrical signal and the desired draft force, wherein the generated acceleration-compensated output signal effects a vertical movement of the ground engaging member of the implement relative to the ground taking into account both the desired draft force and the degree of acceleration of the tractor.

In accordance with a further example of the method 600, the draft control system comprises a sensor generating a deceleration signal representative of the tractor decelerating, wherein the draft control logic is executable by the processor device to determine a deceleration-compensated electrical signal by offsetting the sensed electrical signal by an amount corresponding to a degree of acceleration of the tractor, and generate an deceleration-compensated output signal based on a difference between the determined deceleration-compensated electrical signal and the desired draft force, wherein the generated deceleration-compensated output signal effects a vertical movement of the ground engaging member of the implement relative to the ground taking into account both the desired draft force and the degree of deceleration of the tractor.

Figure 7:
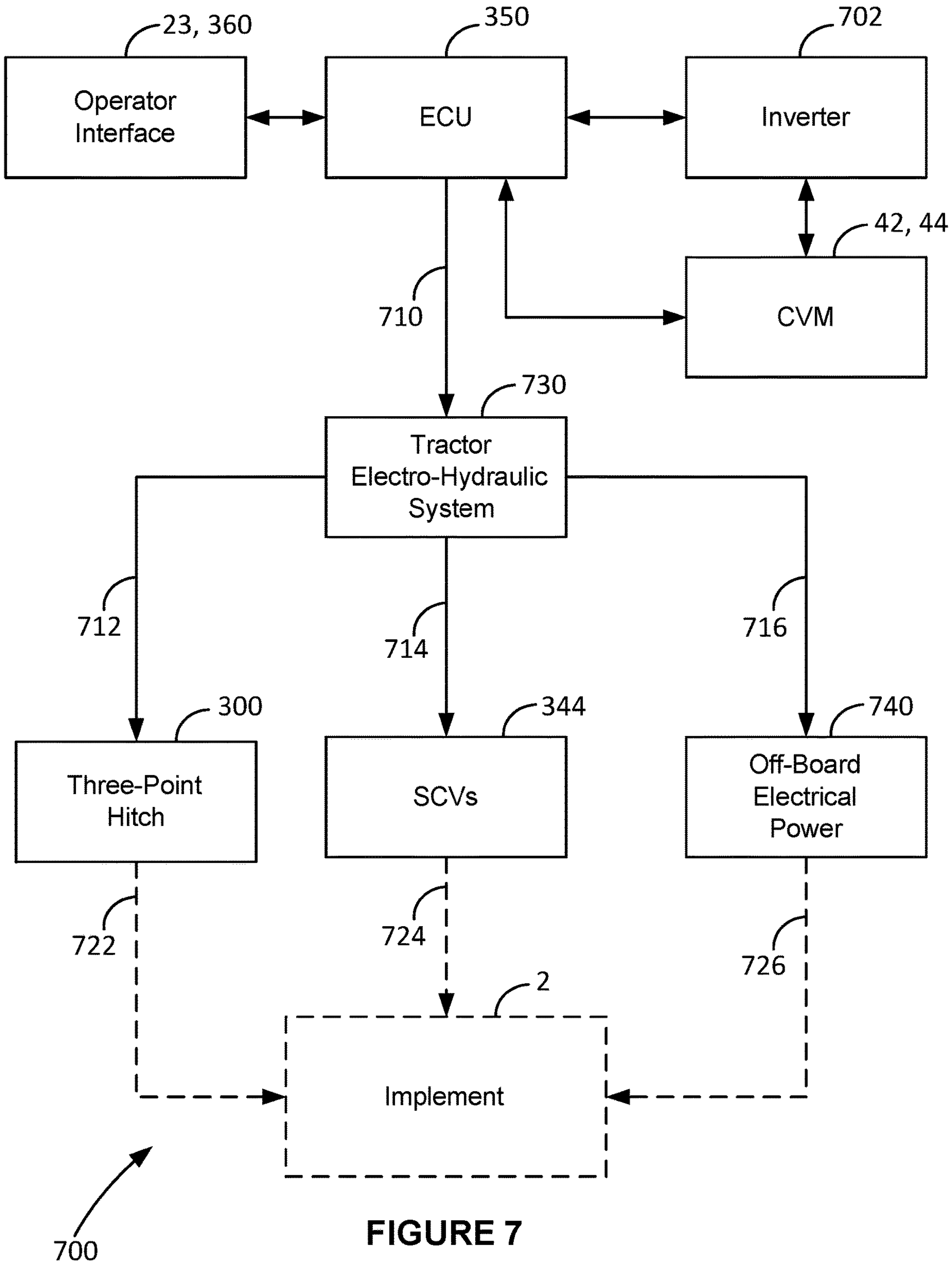
FIG. 7 is a schematic block diagram of a control system according to an example embodiment of the present disclosure.

FIG. 7 is a schematic block diagram of a draft control system 700 in accordance with an example implementation. In accordance with an aspect, the control system 700 generates one or more signals 710, 712, 714, 716, 722, 724, 726 used to modify the working depth of an implement 2 attached with a tractor based on a draft force that is sensed without working parts at the implement. The draft control system 700 in accordance with an example implementation includes a microprocessor based electronic control unit (ECU) 350 that receives a blade position signal from a suitable sensor, and a draft force signal from the powertrain 14 (FIG. 4). The electronic control unit (ECU) 350 may receive a vehicle or ground speed signal from a suitable sensor, and any one or more additional signals as may be necessary or desired. ECU 350 also receives signals from operator controls 360 which may include a touch panel control unit 362 (FIG. 5) of the human-vehicle operator interface 23.

The ECU 350 is preferably programmed by the draft control logic 219 (FIG. 1) that is stored in the non-transitory memory device 221, and is executed by the processor 220 to perform a method of automatic depth control to generate a signal controlling the solenoid control valve (SCV) 344 of the tractor that is used to modify the working depth of a ground-engaging portion of a drawbar-attached implement based on a draft force that is sensed internally within an eCVT of the tractor. In a further embodiment, the ECU 350 is preferably programmed by the draft control logic 219 to perform a method of automatic depth control to generate a signal controlling a hitch of a tractor to modify the working depth of a ground-engaging portion of an implement by raising and lowering a hitch 300 attaching the implement with the tractor based on a draft force that is sensed internally within an electric infinitely/continuously variable transmission (eCVT) of the tractor. In a further embodiment, the ECU 350 is preferably programmed by the draft control logic 219 to perform a method of automatic depth control to generate a signal controlling electro-mechanical actuators 740 on an implement coupled with the tractor to modify the working depth of a ground-engaging portion of the implement by raising and lowering the ground-engaging portion based on a draft force that is sensed internally within an electric infinitely/continuously variable transmission (eCVT) of the tractor.

In accordance with an aspect, the control system 700 generates one or more signals 710, 712, 714, 716, 722, 724, 726 used to modify the working depth of a ground-engaging portion of an implement 2 attached with a tractor based on a draft force that is sensed without working parts at devices coupling the implement 2 with the tractor such as hitches and/or drawbars.

In accordance with an aspect, the control system 700 generates one or more signals 710, 712, 714, 716, 722, 724, 726 controlling an electro-hydraulic system 730 of a tractor based on a sensed draft force to modify the working depth of an implement 2 by raising and/or lowering the implement using the electro-hydraulic system 730 of the tractor, wherein the draft force is sensed internally within an electric infinitely/continuously variable transmission (eCVT) of the tractor.

In accordance with an aspect, the control system 700 generates one or more signals 710, 712, 722 controlling a hitch 300 of a tractor based on a sensed draft force to modify the working depth of an implement 2 by raising and/or lowering a hitch attaching the implement 2 with the tractor, wherein the draft force is sensed internally within an electric infinitely/continuously variable transmission (eCVT) 14 of the tractor. In an example implementation, the hitch may be raised and/or lowered by an electro-hydraulic system 730 of the tractor in response to the one or more signals 710, 712, 722 from the ECU 350.

In accordance with an aspect, the control system generates one or more signals 710, 714, 724 controlling one or more selective control valves (SCVs) 344 of a tractor based on a sensed draft force to modify the working depth of a drawbar-attached implement 2, wherein the draft force is sensed internally within an eCVT of the tractor. In an example implementation, the working depth of a drawbar-attached implement may be increased and/or decreased by an electro-hydraulic system 730 of the tractor activating the one or more SCVs 344 in response to the one or more signals 710, 714, 724 from the ECU 350.

In accordance with an aspect, the control system 700 generates one or more signals 710, 716, 726 controlling one or more electrical power systems 740 off-board of the tractor based on a sensed draft force to modify the working depth of a drawbar-attached implement, wherein the draft force is sensed internally within an eCVT of the tractor. In an example implementation, the working depth of a drawbar-attached implement may be increased and/or decreased by an electro-hydraulic system 730 of the tractor activating the one or more off-board power systems 740 in response to the one or more signals 710, 716, 726 from the control system.

In accordance with an aspect, an inverter 702 senses a current in one or more continuously variable machines (CVMs) 42, 44, wherein the sensed current is representative of a draft force of a working implement 2 on a tractor.

In accordance with an aspect, an electronic control unit (ECU) 350 determines transmission output torque from a sensed current in one or more CVMs 42, 44. In an example implementation, the determined transmission output torque is representative of a draft force of a working implement 2 on a tractor.

In accordance with an aspect, the ECU 350 determines transmission output torque from a sensed current in one or more CVMs 42, 44, wherein the determined transmission output torque is based or otherwise dependent upon one or more of a mode of the transmission, a gear of the transmission, a speed of the transmission, and/or a final gear ratio of the transmission.

In accordance with an aspect, the ECU 350 determines drawbar or draft load from determined transmission output torque.

In accordance with an aspect, the ECU 350 determines whether the determined draft load is between a lower threshold and an upper threshold.

In accordance with an aspect, the ECU 350 adjusts the implement 2 in a first direction when the calculated draft load is below the lower threshold (e.g., lowers the implement via the three-point hitch 300, SCVs 344, and/or the off-board electrical power system 740 or otherwise adjusts implement to increase draft load).

In accordance with an aspect, the ECU 350 adjusts the implement 2 in a second direction when the calculated draft load is above the upper threshold (e.g., raises the implement via the three-point hitch 300, SCVs 344, and/or the off-board electrical power system 740 or otherwise adjusts implement to decrease draft load).

In accordance with an aspect, an operator interface 23, 360 receives input signals from an operator wherein the received signals are used by the ECU 350 to set or otherwise adjust one or more of the lower and/or upper thresholds via the operator interface 23, 360. Operator controls 360 include a touch panel control unit 362 of the human-vehicle operator interface 23.

In accordance with an aspect, the operator interface 23, 360 receives input signals from an operator wherein the received signals are used by the ECU 350 to activate and/or deactivate automated draft sensing by the system 600 via the operator interface 23, 360. Operator controls 360 include a touch panel control unit 362 of the human-vehicle operator interface 23.

In accordance with an aspect, the operator interface 23, 360 includes a display that provides a visual indication of a condition or state of the system including an indication of the system in an activated condition or state and/or an indication of the system in a deactivated condition or state. The operator interface 23 also includes the display device, which can be implemented as a flat panel display device or other display type that is integrated with an instrument panel or console of the work vehicle 1.

In accordance with an aspect, the operator interface 23, 360 includes a display that provides a visual indication of a draft load. In accordance with an aspect of this disclosure, the operator interface display provides a visual indication of the draft load being above and/or below the upper and/or lower threshold(s).

In accordance with a further aspect of this disclosure, an operator interface 23, 360 includes a display that provides a visual indication of whether system is actively adjusting the implement. In accordance with an aspect of this disclosure, the operator interface display provides a visual indication of the system actively adjusting the working depth of an implement attached with the tractor. In accordance with an aspect of this disclosure, the operator interface display provides a visual indication of the system actively adjusting the working depth of an implement attached with the tractor based on a sensed draft force. In accordance with an aspect of this disclosure, the operator interface display provides a visual indication of the system actively adjusting the working depth of an implement attached with the tractor based on a draft force that is sensed without working parts at the implement and/or without working parts at a drawbar pulling the implement and/or without working parts at a hitch carrying the implement on the tractor.

In accordance with a further example, the draft control system 700 comprises a sensor 27 generating an inclination signal representative of the tractor traversing inclined terrain, wherein the draft control logic 219 is executable by the processor device to determine a degree of inclination of the terrain based on the inclination signal, determine a terrain-compensated electrical signal by offsetting the sensed electrical signal by an amount corresponding to the determined degree of inclination of the terrain, and generate a terrain-compensated output signal based on a difference between the determined terrain-compensated electrical signal and the desired draft force, wherein the generated terrain-compensated output signal effects the vertical movement of the ground engaging member of the implement relative to the ground via one or more of the electro-hydraulic system 730, the hitch 300, the SCVs 344, and/or the off-board power systems 740, taking into account both the desired draft force and the determined degree of inclination of the terrain.

In accordance with a further example, the draft control system 700 comprises a sensor 27 generating a declination signal representative of the tractor traversing declined terrain, wherein the draft control logic 219 is executable by the processor device to determine a degree of declination of the terrain based on the declination signal, determine a terrain-compensated electrical signal by offsetting the sensed electrical signal by an amount corresponding to the determined degree of declination of the terrain, and generate a terrain-compensated output signal based on a difference between the determined terrain-compensated electrical signal and the desired draft force, wherein the generated terrain-compensated output signal effects the vertical movement of the ground engaging member of the implement relative to the ground via one or more of the electro-hydraulic system 730, the hitch 300, the SCVs 344, and/or the off-board power systems 740, taking into account both the desired draft force and the determined degree of declination of the terrain.

In accordance with a further example, the draft control system 700 comprises a sensor 27 generating an acceleration signal representative of the tractor accelerating, wherein the draft control logic 219 is executable by the processor device to determine an acceleration-compensated electrical signal by offsetting the sensed electrical signal by an amount corresponding to a degree of acceleration of the tractor, and generate an acceleration-compensated output signal based on a difference between the determined acceleration-compensated electrical signal and the desired draft force, wherein the generated acceleration-compensated output signal effects a vertical movement of the ground engaging member of the implement relative to the ground via one or more of the electro-hydraulic system 730, the hitch 300, the SCVs 344, and/or the off-board power systems 740, taking into account both the desired draft force and the degree of acceleration of the tractor.

In accordance with a further example, the draft control system 700 comprises a sensor 700 generating a deceleration signal representative of the tractor decelerating, wherein the draft control logic 219 is executable by the processor device to determine a deceleration-compensated electrical signal by offsetting the sensed electrical signal by an amount corresponding to a degree of acceleration of the tractor, and generate an deceleration-compensated output signal based on a difference between the determined deceleration-compensated electrical signal and the desired draft force, wherein the generated deceleration-compensated output signal effects a vertical movement of the ground engaging member of the implement relative to the ground via one or more of the electro-hydraulic system 730, the hitch 300, the SCVs 344, and/or the off-board power systems 740, taking into account both the desired draft force and the degree of deceleration of the tractor.

As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

The invention claimed is:

1. An agricultural work vehicle operable to control a draft force imposed upon the work vehicle by a ground engaging member of an associated implement attached with the work vehicle, the work vehicle comprising:

one or more electric continuously variable power sources (eCVPs);

an engine;

an electric continuously variable transmission (eCVT) operably coupled with the engine and with the one or more eCVPs, the eCVT being operable in a split-path power transmission mode in which power from both the engine and the one or more eCVPs is combined for delivering useful power to an output member of the eCVT;

one or more ground engaging members operably coupled with the output member of the eCVT for propelling the work vehicle relative to the ground in response to the useful power being delivered to the output member; and a draft control system comprising:

a processor device;

a non-transient memory device operatively coupled with the processor device, the non-transient memory device storing draft control logic executable by the processor device to control the draft force imposed upon the work vehicle by the ground engaging member of the implement attached with the work vehicle by:

sensing a voltage and/or a current in the one or more eCVPs as an electrical signal representative of a sensed draft force imposed upon the work vehicle by the ground engaging member of the implement attached with the work vehicle;

comparing the sensed electrical signal representative of the sensed draft force with a desired draft force; and generating an output signal based on a difference between the sensed electrical signal representative of the sensed draft force and the desired draft force, wherein the generated output signal effects a vertical movement of the ground engaging member of the implement relative to the ground.

2. The work vehicle according to claim 1, wherein:

the draft control logic is executable by the processor device to sense the voltage and/or current in the one or more eCVPs by averaging sensed voltage and/or current in a pair of eCVPs of the work vehicle.

3. The work vehicle according to claim 1, wherein:

the draft control logic is executable by the processor device to sense the voltage and/or current in the one or more eCVPs by summing sensed voltage and/or current in a pair of eCVPs of the work vehicle.

4. The work vehicle according to claim 1, further comprising:

an output circuit operatively coupled with the processor device, wherein the draft control logic is executable by the processor device to generate the output signal by:

generating an electric selective control valve (SCV) output signal by the output circuit based on the difference between the sensed electrical signal representative of the sensed draft force and the desired draft force, wherein the generated SCV output signal effects a control of an SCV operatively coupling the implement with the work vehicle via the output circuit thereby effecting the vertical movement of the ground engaging member of the implement relative to the ground.

5. The work vehicle according to claim 1, further comprising:

an output circuit operatively coupled with the processor device, wherein the draft control logic is executable by the processor device to generate the output signal by:

generating a hydraulic output signal based on the difference between the sensed electrical signal representative of the sensed draft force and the desired draft force, wherein the generated hydraulic output signal effects a control of a three point hitch of the work vehicle carrying the implement, thereby effecting the vertical movement of the ground engaging member of the implement relative to the ground.

6. The work vehicle according to claim 1, further comprising:

an output circuit operatively coupled with the processor device, wherein the draft control logic is executable by the processor device to generate the output signal by:

generating an electric output signal by the output circuit based on the difference between the sensed electrical signal representative of the sensed draft force and the desired draft force, wherein the generated electric output signal effects a control of an off-board electrical power system operable to effect the vertical movement of the ground engaging member of the implement relative to the ground.

7. The work vehicle according to claim 1, further comprising:

an output circuit operatively coupled with the processor device, wherein the draft control logic is executable by the processor device to generate the output signal by:

generating a first output signal by the output circuit based on a difference between the sensed electrical signal representative of the sensed draft force and a desired upper threshold draft force, wherein the generated first output signal effects a vertical movement raising the ground engaging member of the implement relative to the ground to decrease the draft force on the work vehicle, or generating a second output signal by the output circuit based on a difference between the sensed electrical signal representative of the sensed draft force and a desired lower threshold draft force, wherein the generated second output signal effects a vertical movement lowering the ground engaging member of the implement relative to the ground to increase the draft force on the work vehicle.

8. The work vehicle according to claim 7, further comprising:

an operator interface circuit operatively coupled with the processor device of the draft control system, wherein the draft control logic is executable by the processor device to:

receive signals via the operator interface circuit that are representative of the desired upper and lower threshold draft forces.

9. The work vehicle according to claim 7, further comprising:

an operator interface circuit operatively coupled with the processor device of the draft control system, wherein the draft control logic is executable by the processor device to:

display visual indicia on a display device of the operator interface of one or more of:

the generated first output signal effecting the vertical movement raising the ground engaging member of the implement relative to the ground to decrease the draft force on the work vehicle; and/or the generated second output signal effecting the vertical movement lowering the ground engaging member of the implement relative to the ground to increase the draft force on the work vehicle.

10. The work vehicle according to claim 1, further comprising:

an inclination sensor operatively coupled with the processor device of the draft control system generating an inclination signal representative of the work vehicle traversing inclined terrain, wherein the draft control logic is executable by the processor device to:

determine a degree of inclination of the terrain based on the inclination signal;

determine a terrain-compensated electrical signal by offsetting the sensed electrical signal by an amount corresponding to the determined degree of inclination of the terrain; and generate a terrain-compensated output signal based on a difference between the determined terrain-compensated electrical signal and the desired draft force, wherein the generated terrain-compensated output signal effects the vertical movement of the ground engaging member of the implement relative to the ground taking into account both the desired draft force and the determined degree of inclination of the terrain.

11. The work vehicle according to claim 1, further comprising:

a declination sensor operatively coupled with the processor device of the draft control system generating a declination signal representative of the work vehicle traversing declined terrain, wherein the draft control logic is executable by the processor device to:

determine a degree of declination of the terrain based on the declination signal;

determine a terrain-compensated electrical signal by offsetting the sensed electrical signal by an amount corresponding to the determined degree of declination of the terrain; and generate a terrain-compensated output signal based on a difference between the determined terrain-compensated electrical signal and the desired draft force, wherein the generated terrain-compensated output signal effects the vertical movement of the ground engaging member of the implement relative to the ground taking into account both the desired draft force and the determined degree of declination of the terrain.

12. The work vehicle according to claim 1, further comprising:

an acceleration sensor operatively coupled with the processor device of the draft control system generating an acceleration signal representative of the work vehicle accelerating, wherein the draft control logic is executable by the processor device to:

determine an acceleration-compensated electrical signal by offsetting the sensed electrical signal by an amount corresponding to a degree of acceleration of the work vehicle; and generate an acceleration-compensated output signal based on a difference between the determined acceleration-compensated electrical signal and the desired draft force, wherein the generated acceleration-compensated output signal effects a vertical movement of the ground engaging member of the implement relative to the ground taking into account both the desired draft force and the degree of acceleration of the work vehicle.

13. The work vehicle according to claim 1, further comprising:

a deceleration sensor operatively coupled with the processor device of the draft control system generating a deceleration signal representative of the work vehicle decelerating, wherein the draft control logic is executable by the processor device to:

determine a deceleration-compensated electrical signal by offsetting the sensed electrical signal by an amount corresponding to a degree of deceleration of the work vehicle; and generate an deceleration-compensated output signal based on a difference between the determined deceleration-compensated electrical signal and the desired draft force, wherein the generated deceleration-compensated output signal effects a vertical movement of the ground engaging member of the implement relative to the ground taking into account both the desired draft force and the degree of deceleration of the work vehicle.

14. A method in an agricultural work vehicle of controlling a draft force imposed upon the work vehicle by a ground engaging member of an associated implement attached with the work vehicle, the method comprising:

sensing as an electrical signal a voltage and/or a current in one or more electric continuously variable power sources (eCVPs) operatively coupled with an electric continuously variable transmission (eCVT) of the work vehicle, wherein the eCVT is operable in a split-path power transmission mode in which power from both an engine of the work vehicle and the one or more eCVPs of the work vehicle is combined for delivering useful power to an output member of the eCVT, wherein the electrical signal in the one or more eCVPs is representative of a sensed draft force imposed upon the work vehicle by the ground engaging member of the implement attached with the work vehicle;

comparing the sensed electrical signal representative of the sensed draft force with a desired draft force; and generating an output signal based on a difference between the sensed electrical signal representative of the sensed draft force and the desired draft force, wherein the generated output signal effects a vertical movement of the ground engaging member of the implement relative to the ground.

15. The method according to claim 14, wherein:

the sensing the voltage and/or current in the one or more eCVPs comprises averaging sensed voltage and/or current in a pair of eCVPs of the work vehicle.

16. The method according to claim 14, wherein:

the sensing the voltage and/or current in the one or more eCVPs comprises summing sensed voltage and/or current in a pair of eCVPs of the work vehicle.

17. The method according to claim 14, wherein:

the generating the output signal comprises generating an electric selective control valve (SCV) output signal based on the difference between the sensed electrical signal representative of the sensed draft force and the desired draft force, wherein the generated SCV output signal effects a control of an SCV operatively coupling the implement with the work vehicle thereby effecting the vertical movement of the ground engaging member of the implement relative to the ground.

18. The method according to claim 14, wherein:

the generating the output signal comprises:

generating a first output signal based on a difference between the sensed electrical signal representative of the sensed draft force and a desired upper threshold draft force, wherein the generated first output signal effects a vertical movement raising the ground engaging member of the implement relative to the ground to decrease the draft force on the work vehicle, or generating a second output signal based on a difference between the sensed electrical signal representative of the sensed draft force and a desired lower threshold draft force, wherein the generated second output signal effects a vertical movement lowering the ground engaging member of the implement relative to the ground to increase the draft force on the work vehicle.

19. The method according to claim 14, wherein:

the generating the output signal comprises:

generating a hydraulic output signal based on the difference between the sensed electrical signal representative of the sensed draft force and the desired draft force, wherein the generated hydraulic output signal effects a control of a three point hitch of the work vehicle carrying the implement, thereby effecting the vertical movement of the ground engaging member of the implement relative to the ground.

20. The method according to claim 14, wherein:

the generating the output signal comprises:

generating an electric output signal by the output circuit based on the difference between the sensed electrical signal representative of the sensed draft force and the desired draft force, wherein the generated electric output signal effects a control of an off-board electrical power system operable to effect the vertical movement of the ground engaging member of the implement relative to the ground.

* * * * *